(12) United States Patent
Nakamura

(10) Patent No.: US 8,264,115 B2
(45) Date of Patent: Sep. 11, 2012

(54) STATOR FOR ELECTRIC ROTATING MACHINE

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 138 days.

(21) Appl. No.: 12/962,920

(22) Filed: Dec. 8, 2010

(65) Prior Publication Data

US 2011/0133593 A1     Jun. 9, 2011

(30) Foreign Application Priority Data

Dec. 9, 2009   (JP) ................................. 2009-279867
Nov. 18, 2010   (JP) ................................. 2010-258202

(51) Int. Cl.
     *H02K 3/04*      (2006.01)
(52) U.S. Cl. ......................... 310/201; 310/208; 310/184
(58) Field of Classification Search .......... 310/179–180, 310/184

See application file for complete search history.

(56) References Cited

U.S. PATENT DOCUMENTS

| | | | | |
|---|---|---|---|---|
| 5,886,434 | A | * | 3/1999 | Nygard ........................... 310/61 |
| 5,955,810 | A | * | 9/1999 | Umeda et al. .................. 310/208 |
| 5,998,903 | A | * | 12/1999 | Umeda et al. .................. 310/179 |
| 6,124,660 | A | * | 9/2000 | Umeda et al. .................. 310/215 |
| 6,198,190 | B1 | * | 3/2001 | Umeda et al. .................. 310/179 |
| 6,715,199 | B2 | | 4/2004 | Kusumoto et al. |
| 7,170,210 | B2 | * | 1/2007 | Even et al. ..................... 310/201 |
| 2006/0001326 | A1 | * | 1/2006 | Even et al. ..................... 310/179 |
| 2009/0121576 | A1 | * | 5/2009 | Even et al. ..................... 310/208 |

FOREIGN PATENT DOCUMENTS

JP      2001-145286      5/2001

* cited by examiner

*Primary Examiner* — Thanh Lam
(74) *Attorney, Agent, or Firm* — Nixon & Vanderhye PC

(57) ABSTRACT

A stator includes a hollow cylindrical stator core and a stator coil comprised of electric wires. Each of the electric wires has n in-slot portions and (n−1) turn portions, where n≧4. The in-slot portions are sequentially received in p slots of the stator core, where p≧n. The turn portions are located outside the slots to connect adjacent pairs of the in-slot portions. The radial distances from the longitudinal axis of the stator core to the first to the nth in-slot portions successively decrease. Each of the electric wires further includes bulges. Each of the bulges is formed, on a surface of a corresponding one of the in-slot portions or a surface of a portion of the electric wire which falls on an imaginary line extending axially from the corresponding in-slot portion, so as to protrude from the corresponding in-slot portion in a radial direction.

13 Claims, 29 Drawing Sheets

FIG.16

| SLOT NUMBER | OUTERMOST LAYER | INNERMOST LAYER |
|---|---|---|
| 1 | U1-1 | U1-3' |
| 2 | U2-1 | U2-3' |
| 3 | W1-1' | W1-3 |
| 4 | W2-1' | W2-3 |
| 5 | V1-1 | V1-3' |
| 6 | V2-1 | V2-3' |
| 7 | U1-1' | U1-4 |
| 8 | U2-1' | U2-4 |
| 9 | W1-2 | W1-4' |
| 10 | W2-2 | W2-4' |
| 11 | V1-1' | V1-4 |
| 12 | V2-1' | V2-4 |
| 13 | U1-2 | U1-4' |
| 14 | U2-2 | U2-4' |
| 15 | W1-2' | W1-4 |
| 16 | W2-2' | W2-4 |
| 17 | V1-2 | V1-4' |
| 18 | V2-2 | V2-4' |
| 19 | U1-2' | U1-1 |
| 20 | U2-2' | U2-1 |
| 21 | W1-2 | W1-1' |
| 22 | W2-2 | W2-1' |
| 23 | V1-2' | V1-1 |
| 24 | V2-2' | V2-1 |

| SLOT NUMBER | OUTERMOST LAYER | INNERMOST LAYER |
|---|---|---|
| 25 | U1-3 | U1-1' |
| 26 | U2-3 | U2-1' |
| 27 | W1-3' | W1-1 |
| 28 | W2-3' | W2-1 |
| 29 | V1-3 | V1-1' |
| 30 | V2-3 | V2-1' |
| 31 | U1-3' | U1-2 |
| 32 | U2-3' | U2-2 |
| 33 | W1-3 | W1-2' |
| 34 | W2-3 | W2-2' |
| 35 | V1-3' | V1-2 |
| 36 | V2-3' | V2-2 |
| 37 | U1-4 | U1-2' |
| 38 | U2-4 | U2-2' |
| 39 | W1-4' | W1-2 |
| 40 | W2-4' | W2-2 |
| 41 | V1-4 | V1-2' |
| 42 | V2-4 | V2-2' |
| 43 | U1-4' | U1-3 |
| 44 | U2-4' | U2-3 |
| 45 | W1-4 | W1-3' |
| 46 | W2-4 | W2-3' |
| 47 | V1-4' | V1-3 |
| 48 | V2-4' | V2-3 |

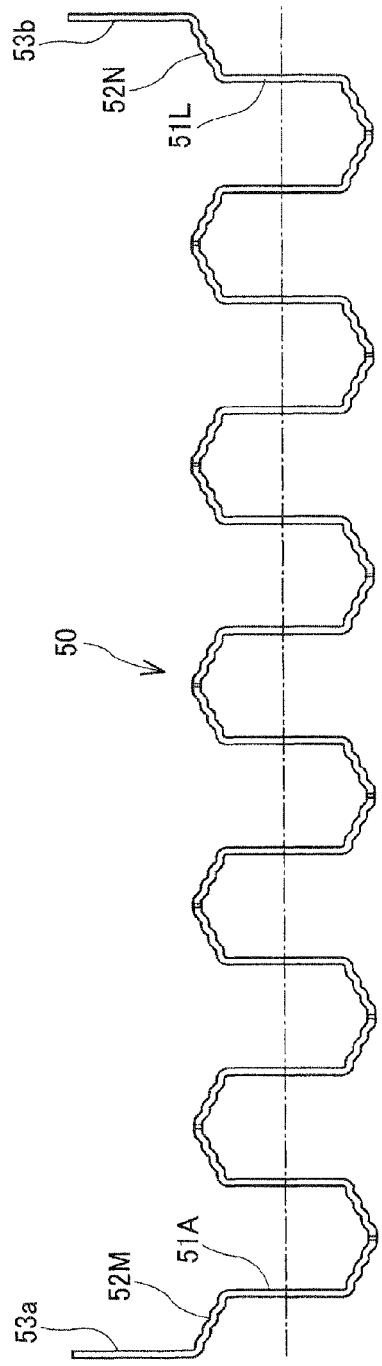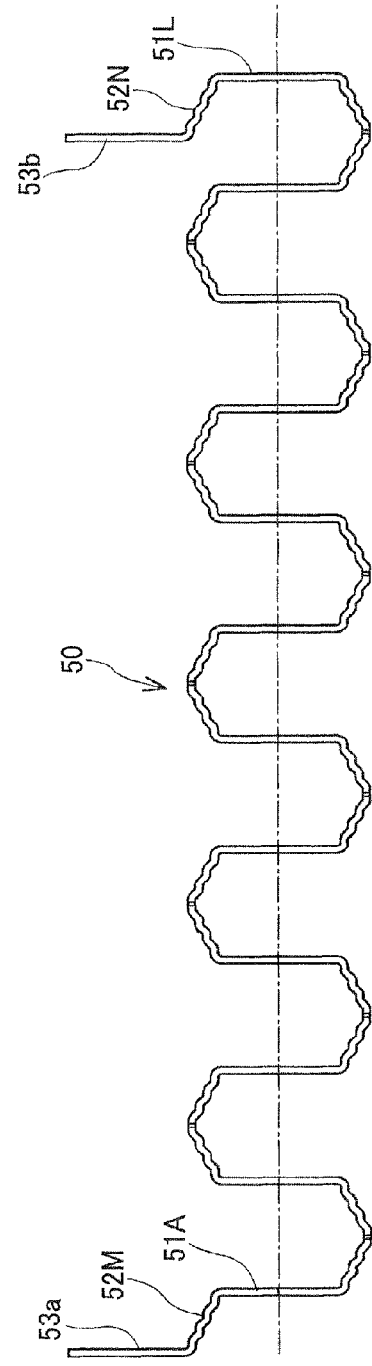

STATOR FOR ELECTRIC ROTATING MACHINE

CROSS-REFERENCE TO RELATED APPLICATIONS

This application is based on and claims priority from Japanese Patent Applications No. 2009-279867 filed on Dec. 9, 2009 and No. 2010-258202 filed on Nov. 18, 2010, the contents of which are hereby incorporated by reference in their entireties into this application.

BACKGROUND OF THE INVENTION

1. Technical Field of the Invention

The present invention relates to stators for electric rotating machines that are used in, for example, motor vehicles as electric motors and electric generators.

2. Description of the Related Art

Conventionally, there are known stators for electric rotating machines which include a hollow cylindrical stator core and a stator coil.

The stator core has a plurality of slots that are formed in the radially inner surface of the stator core and spaced in the circumferential direction of the stator core. The stator coil is comprised of a plurality of electric wires mounted on the stator core. Each of the electric wires includes a plurality of in-slot portions, each of which is received in a corresponding one of the slots of the stator core, and a plurality of turn portions each of which connects an adjacent pair of the in-slot portions and is located outside the slots of the stator core.

Moreover, there is disclosed, for example in Japanese Patent Application Publication No. 2001-145286, a method of manufacturing a stator. According to the method, to improve the space factors of the electric wires in the slots of the stator core, each of the electric wires forming U-phase, V-phase, and W-phase windings of the stator coil is configured to have a rectangular cross section and have such an overall shape that when developed on a plane, the electric wire meanders in the form of cranks. Further, the stator coil is formed by: (1) stacking the electric wires to form a planar electric wire assembly; and (2) rolling the planar electric wire assembly by a predetermined number of turns into a hollow cylindrical shape.

For the thus-formed stator coil, it is necessary for corresponding in-slot portions of the electric wires which are to be received in the same slot of the stator core to be aligned in a radial direction of the stator coil. Further, to improve the space factor of the corresponding in-slot portions of the electric wires in the slot of the stator core, it is necessary to densely arrange the corresponding in-slot portions. As a result, insulating coats provided at the surfaces of the corresponding in-slot portions may be damaged due to friction which is caused between the corresponding in-slot portions during the step of rolling the planar electric wire assembly into the hollow cylindrical shape.

Moreover, with the above method, each of the electric wires is required to have a long length. Accordingly, a large scale shaping machine is needed for shaping the electric wires. Further, since each of the electric wires is long, it is difficult to handle the electric wires during the manufacture of the stator. As a result, it may be difficult to secure a high productivity and a low cost of the stator.

SUMMARY OF THE INVENTION

According to the present invention, there is provided a stator for an electric rotating machine. The stator includes a hollow cylindrical stator core and a stator coil. The stator core has a longitudinal axis and a plurality of slots that are formed in the radially inner surface of the stator core and spaced in the circumferential direction of the stator core. The stator coil is comprised of a plurality of electric wires that are mounted on the stator core so as to be offset from one another in the circumferential direction of the stator core. Each of the electric wires has first, second, . . . , and nth in-slot portions and first, second, . . . , and (n−1)th turn portions, where n is an integer not less than 4. The first to the nth in-slot portions are sequentially received in p of the slots of the stator core, where p is an integer not greater than n. The first to the (n−1)th turn portions are alternately located on opposite axial sides of the stator core outside the slots to connect corresponding adjacent pairs of the first to the nth in-slot portions. The radial distances from the axis of the stator core to the first to the nth in-slot portions successively decrease. Moreover, each of the electric wires further includes a plurality of bulges. Each of the bulges is formed, on a surface of a corresponding one of the in-slot portions of the electric wire or a surface of a portion of the electric wire which falls on an imaginary line extending axially from the corresponding in-slot portion, so as to protrude from the corresponding in-slot portion in a radial direction of the stator core.

According to a further implementation of the invention, each of the electric wires is formed so that each of the turn portions of the electric wire includes a pair of shoulder parts. Each of the shoulder parts adjoins a corresponding one of the in-slot portions of the electric wire and is bent at a substantially right angle to the corresponding in-slot portion to form a bend between the shoulder and the corresponding in-slot portion. Each of the bulges is formed on a surface of a corresponding one of the bends formed between the shoulder parts of the turn portions and the in-slot portions of the electric wire.

Each of the electric wires is formed so that each of the turn portions of the electric wire is stepped to include a plurality of shoulder parts that extend substantially perpendicular to the in-slot portions. Each of the electric wires further includes a plurality of second bulges. Each of the second bulges is formed on a surface of a corresponding one of bends formed between the shoulder parts of the turn portions of the electric wire so as to protrude in a radial direction of the stator core.

The first in-slot portions of the electric wires are located most radially outward and the nth in-slot portions are located most radially inward in the slots of the stator core. Each of the electric wires also has first and second end portions. The first end portion is closer to the first in-slot portion than any other of the in-slot portions of the electric wire; the second end portion is closer to the nth in-slot portion than any other of the in-slot portions of the electric wire. The stator coil is a multi-phase stator coil which is comprised of a plurality of phase windings. Each of the phase windings of the stator coil is formed of at least two of the electric wires. The first end portion of one of the two electric wires is connected to the second end portion of the other electric wire.

The stator coil is formed by first shaping each of the electric wires by plastically deforming it and then assembling the electric wires by creating relative axial movement therebetween.

There is specified the following dimensional relationship: $1.0 < W/L \leq 1.1$, where W is a radial thickness of those portions of the electric wires where the bulges are formed and L is a radial thickness of those portions of the in-slot portions of the electric wires where no bulges are formed.

The number of the electric wires forming the stator coil is equal to the number of the slots formed in the stator core. The electric wires are offset from one another in the circumferential direction of the stator core by one slot pitch of the stator core.

In each of the slots of the stator core, the in-slot portions of the electric wires are radially stacked in n layers.

All of the ith in-slot portions of the electric wires are respectively received in circumferentially-adjacent different ones of the slots of the stator core, and all of the radial distances from the axis of the stator core to the ith in-slot portions of the electric wires are equal, where i=1, 2, ..., n.

For each of the electric wires forming the stator coil, the p slots of the stator core in which the first to the nth in-slot portions of the electric wire are sequentially received, are circumferentially spaced at a pitch of a predetermined number of the slots of the stator core.

Each of the electric wires forming the stator coil is comprised of an electric conductor having a substantially rectangular cross section and an insulating coat covering an outer surface of the electric conductor.

When viewed along the axis of the stator core, each of the electric wires spirally extends around the axis of the stator core.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings:

FIG. 16 is a tabular representation showing both the label of the electric wire located at the radially outermost layer and the label of the electric wire located at the radially innermost layer in each of the slots of the stator core;

FIG. 25A is a front view of an electric wire for forming the stator coil according to a first modification of the invention;

FIG. 25B is a front view of an electric wire for forming the stator coil according to a second modification of the invention;

DESCRIPTION OF PREFERRED EMBODIMENT

Figure 1:
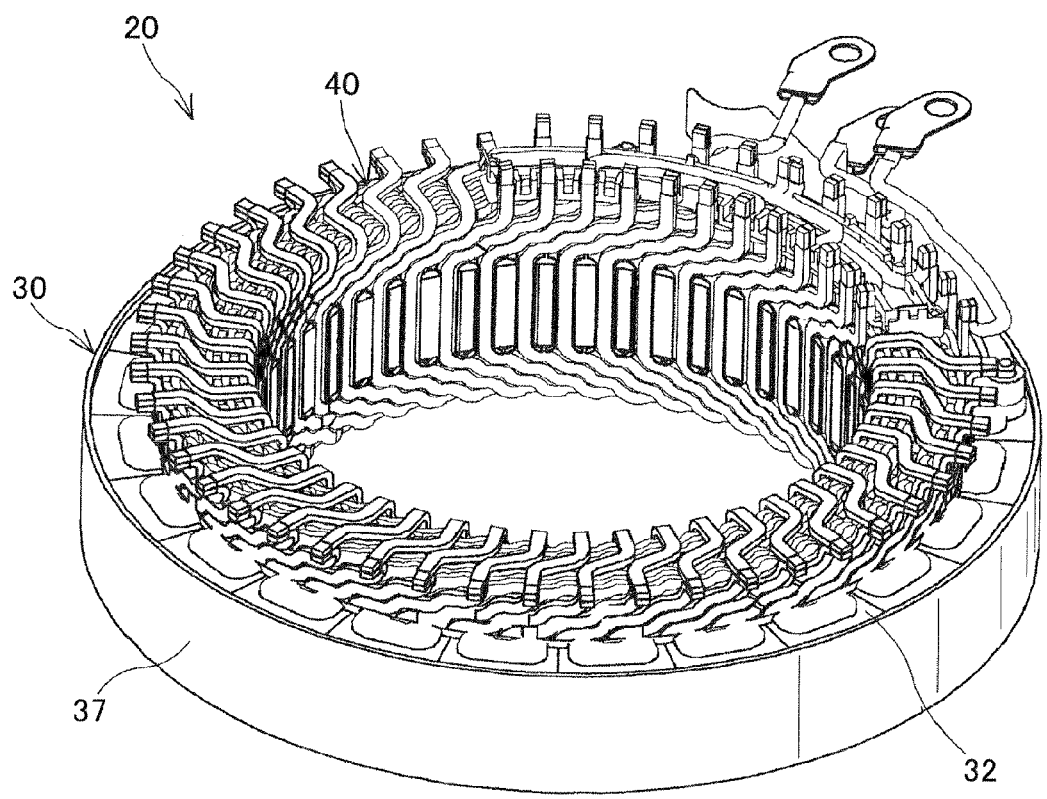
FIG. 1 is a perspective view of a stator for an electric rotating machine according to an embodiment of the invention.
Figure 2:
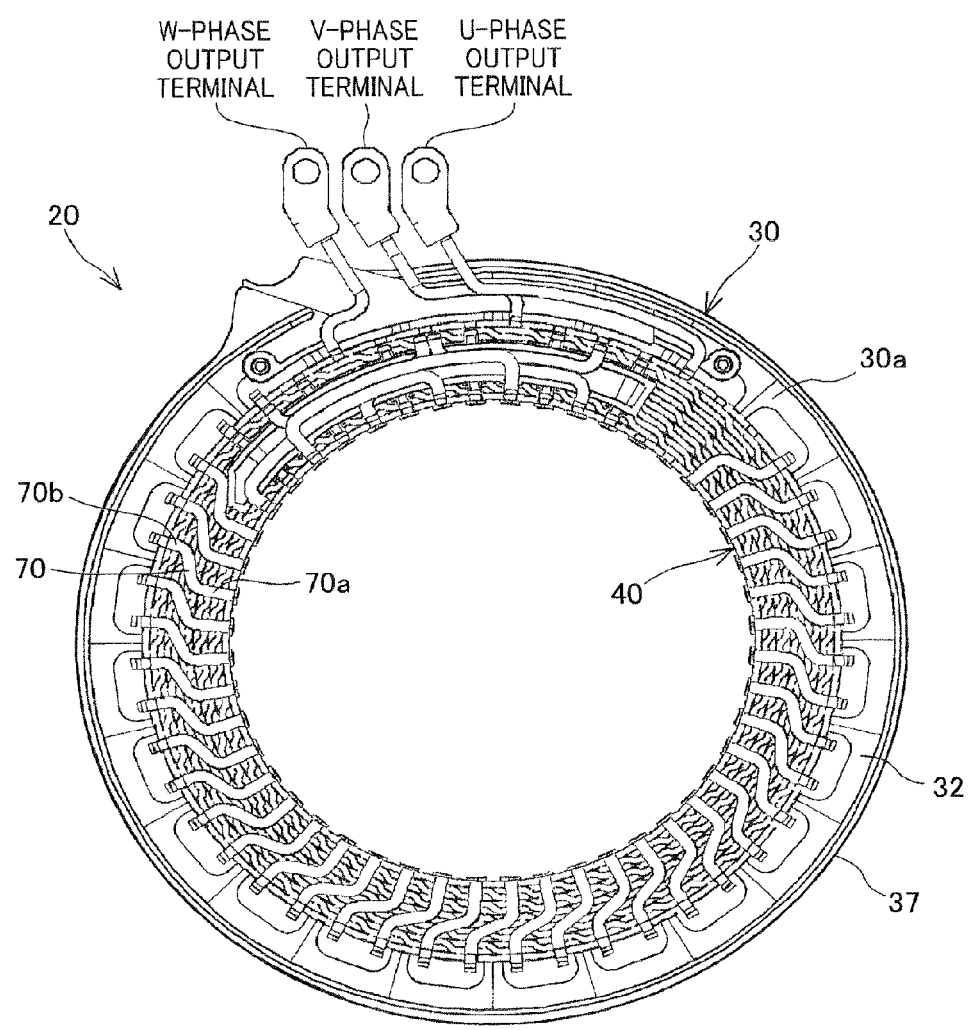
FIG. 2 is a top view of the stator.
Figure 3:
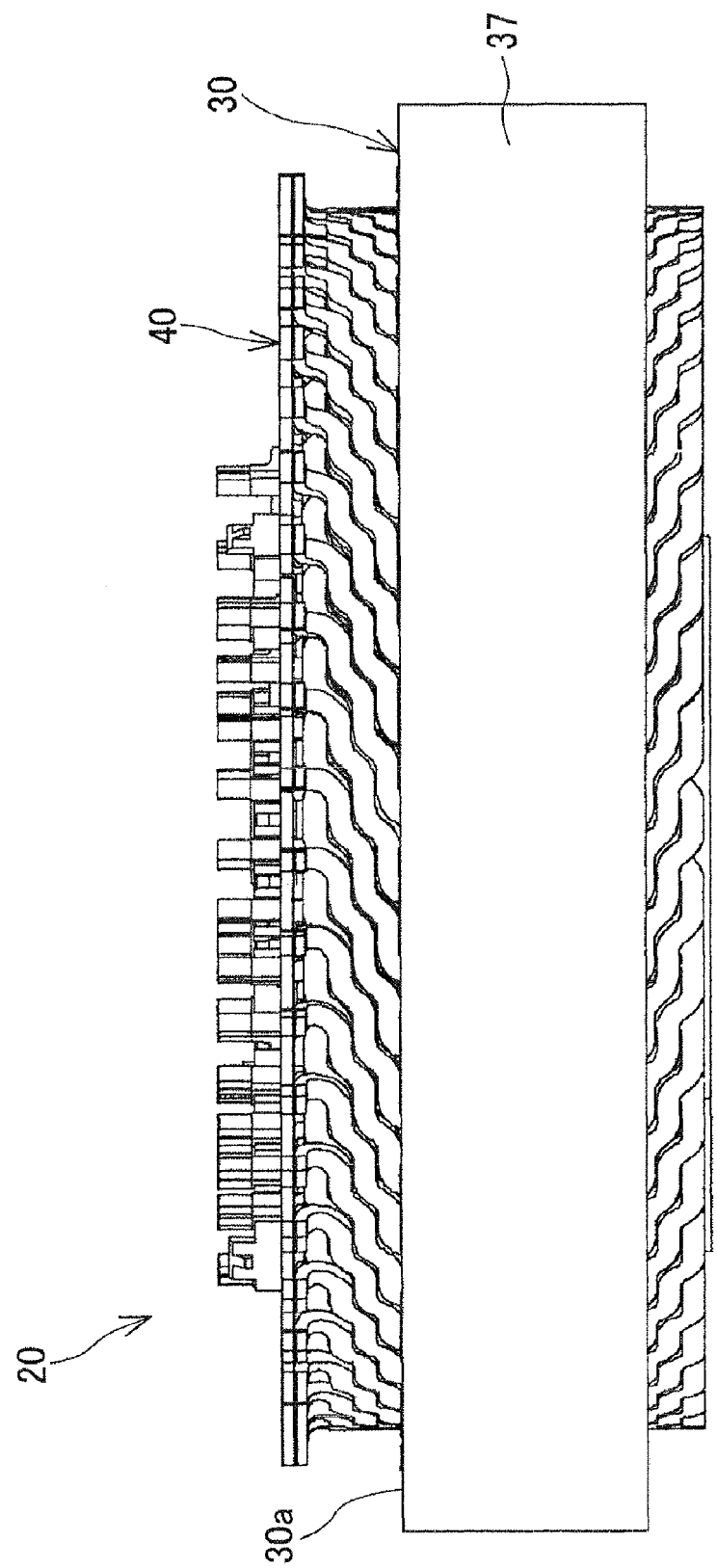
FIG. 3 is a side view of the stator.

FIGS. 1-3 together show the overall configuration of a stator 20 according to an embodiment of the invention.

The stator 20 is designed for use in, for example, an electric rotating machine which is configured to function both as an electric motor and as an electric generator in a motor vehicle. The electric rotating machine further includes a rotor (not shown) that is rotatably disposed so as to be surrounded by the stator 20. The rotor includes a plurality of permanent magnets that form a plurality of magnetic poles on a radially outer periphery of the rotor to face a radially inner periphery of the stator. The polarities of the magnetic poles alternate between north and south in the circumferential direction of the rotor. In addition, in the present embodiment, the number of the magnetic poles formed in the rotor is equal to eight (i.e., four north poles and four south poles).

As shown in FIGS. 1-3, the stator 20 includes a hollow cylindrical stator core 30 and a three-phase stator coil 40 that is comprised of a plurality of (e.g., 48 in the present embodiment) electric wires 50 mounted on the stator core 30. In addition, the stator 20 may further include insulating paper interposed between the stator core 30 and the stator coil 40.

Figure 4:
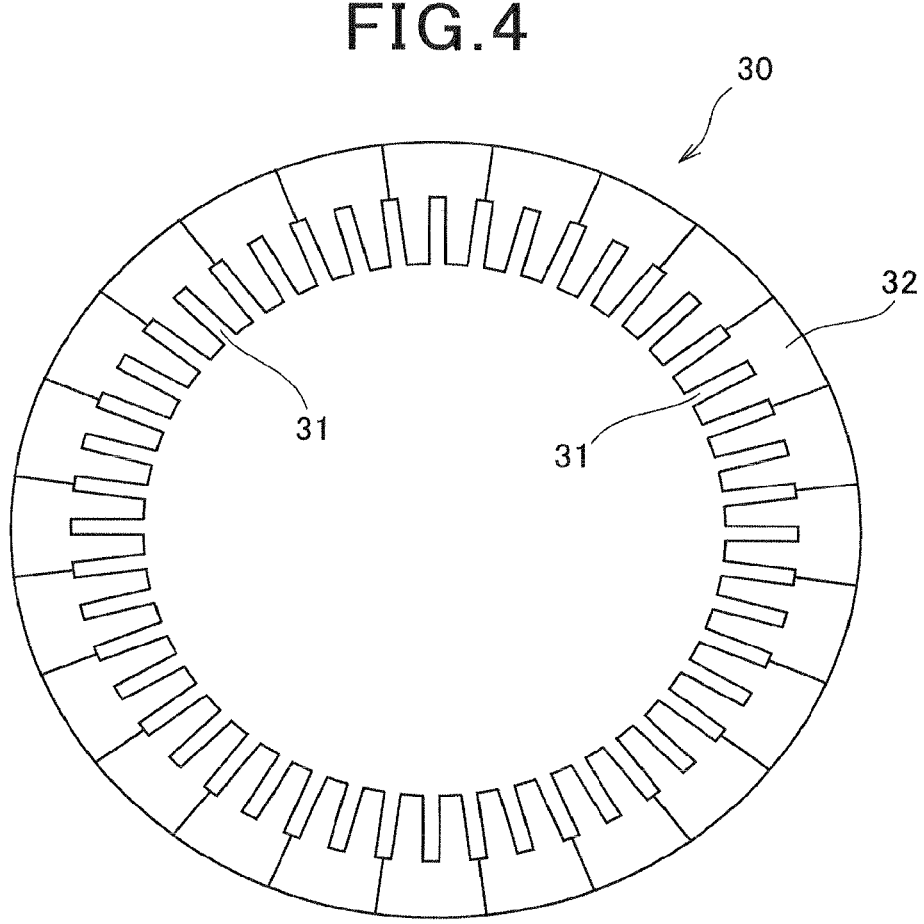
FIG. 4 is a top view of a stator core of the stator.

The stator core 30 has, as shown in FIG. 4, a plurality of slots 31 that are formed in the radially inner surface of the stator core 30 and spaced in the circumferential direction of the stator core 30 at a predetermined pitch. For each of the slots 31, the depth-wise direction of the slot 31 is coincident with a radial direction of the stator core 30. In the present embodiment, there are provided two slots 31 per magnetic pole of the rotor that has the eight magnetic poles and per phase of the three-phase stator coil 40. Accordingly, the total number of the slots 31 provided in the stator core 30 is equal to 48 (i.e., 2×8×3).

Figure 5:
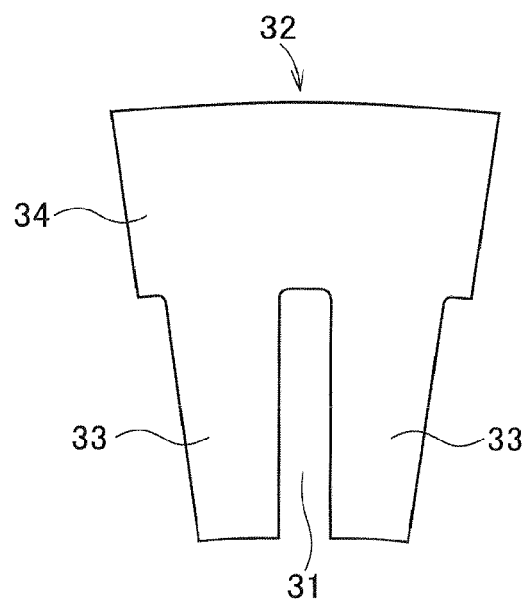
FIG. 5 is a top view of one of stator core segments which together make up the stator core.

Moreover, in the present embodiment, the stator core 30 is composed up of, for example, 24 stator core segments 32 as shown in FIG. 5. The stator core segments 32 are joined together so as to adjoin one another in the circumferential direction of the stator core 30. Each of the stator core segments 32 defines therein one of the slots 31. Further, each circumferentially-adjoining pair of the stator core segments 32 together defines a further one of the slots 31 therebetween. Each of the stator core segments 32 also has two tooth portions 33, which radially extend to form the one of the slots 31 therebetween, and a back core portion 34 that is located radially outward of the tooth portions 33 to connect them. In addition, on the radially outer surfaces of the stator core segments 32, there is fitted a cylindrical outer rim 37 (see FIGS. 1-3).

In the present embodiment, each of the stator core segments 32 is formed by laminating a plurality of magnetic steel sheets with a plurality of insulating films interposed therebetween. It should be noted that other conventional metal sheets may also be used instead of the magnetic steel sheets.

FIGS. 6-9 together show the configuration of the stator coil 40, which is formed with the electric wires 50 into a hollow cylindrical shape.

As shown in FIGS. 6-9, the stator coil 40 has, as a whole, a straight part 41 to be received in the slots 31 of the stator core 30, and a pair of coil end parts 42 that are respectively formed on opposite axial sides of the straight part 41 and to be located outside the slots 31. Moreover, on one axial side of the straight part 41, U-phase, V-phase, and W-phase output terminals and U-phase, V-phase, and W-phase neutral terminals of the stator coil 40 protrude from the annular axial end face of the coil end part 42, and a plurality of crossover parts 70 of the electric wires 50 cross over the axial end face from the radially inner side to the radially outer side of the axial end face to connect corresponding pairs of the electric wires 50.

Figure 10A:
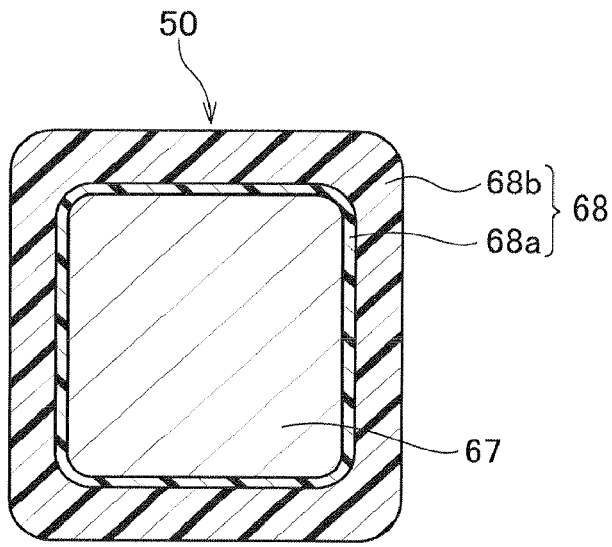
FIG. 10A is a cross-sectional view illustrating the configuration of electric wires forming the stator coil.

Each of the electric wires 50 for forming the stator coil 40 is configured with, as shown in FIG. 10A, an electric conductor 67 and an insulating coat 68 that covers the outer surface of the electric conductor 67. In the present embodiment, the electric conductor 67 is made of copper and has a substantially rectangular cross section. The insulating coat 68 is two-layer structured to include an inner layer 68a and an outer layer 68b. The thickness of the insulating coat 68 (i.e., the sum of thicknesses of the inner and outer layers 68a and 68b) is set to be in the range of 100 to 200 μm.

With such a large thickness of the two-layer structured insulating coat 68, it is possible to reliably insulate the electric wires 50 from one another without interposing insulating paper therebetween. However, it is also possible to interpose insulating paper between the electric wires 50 so as to further enhance the electrical insulation therebetween.

Further, the outer layer 68b is made of an insulating material such as nylon. The inner layer 68a is made of a thermoplastic resin having a higher glass transition temperature than the outer layer 68b or an insulating material having no glass transition temperature such as a polyamide-imide resin. Consequently, the outer layers 68b of the electric wires 50 will be solidified by the heat generated by operation of the electric rotating machine earlier than the inner layers 68a. As a result, the surface hardness of the outer layers 68b will be increased, thereby enhancing the electrical insulation between the electric wires 50.

Figure 10B:
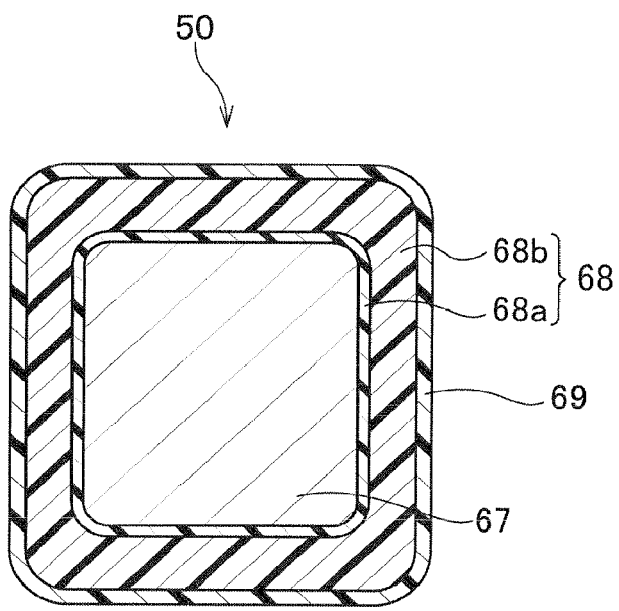
FIG. 10B is a cross-sectional view illustrating a modification of the configuration of the electric wires shown in FIG. 10A.

Furthermore, as shown in FIG. 10B, it is also possible for each of the electric wires 50 to further include a fusible coat 69 to cover the outer surface of the insulating coat 68; the fusible coat 69 may be made, for example, of epoxy resin. In this case, the fusible coats 69 of the electric wires 50 will be fused by the heat generated by operation of the electric rotating machine earlier than the insulating coats 68, thereby bonding together those portions of the electric wires 50 which are received in the same ones of the slots 31 of the stator core 30. As a result, those portions of the electric wires 50 will be integrated into a rigid body, thereby enhancing the mechanical strength thereof. In addition, the outer layers 68b of the insulating coats 68 of the electric wires 50 may also be made of PPS (polyphenylene sulfide).

Figure 11A:
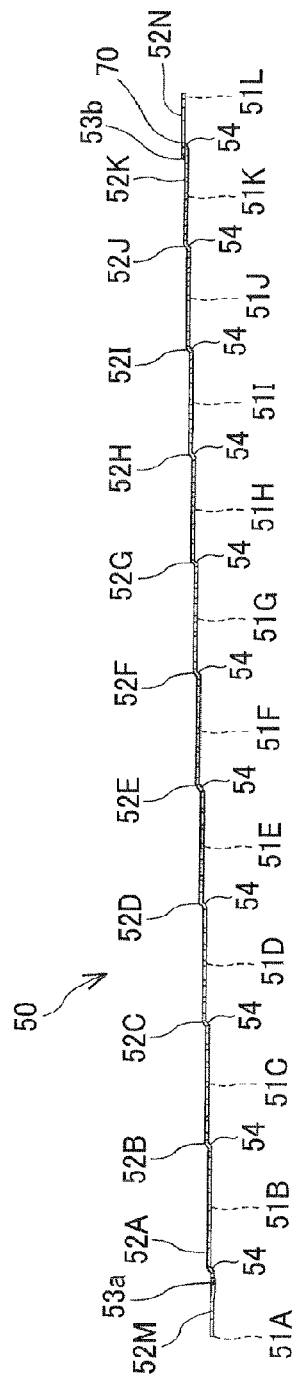
FIG. 11A is a top view of one of the electric wires.
Figure 11B:
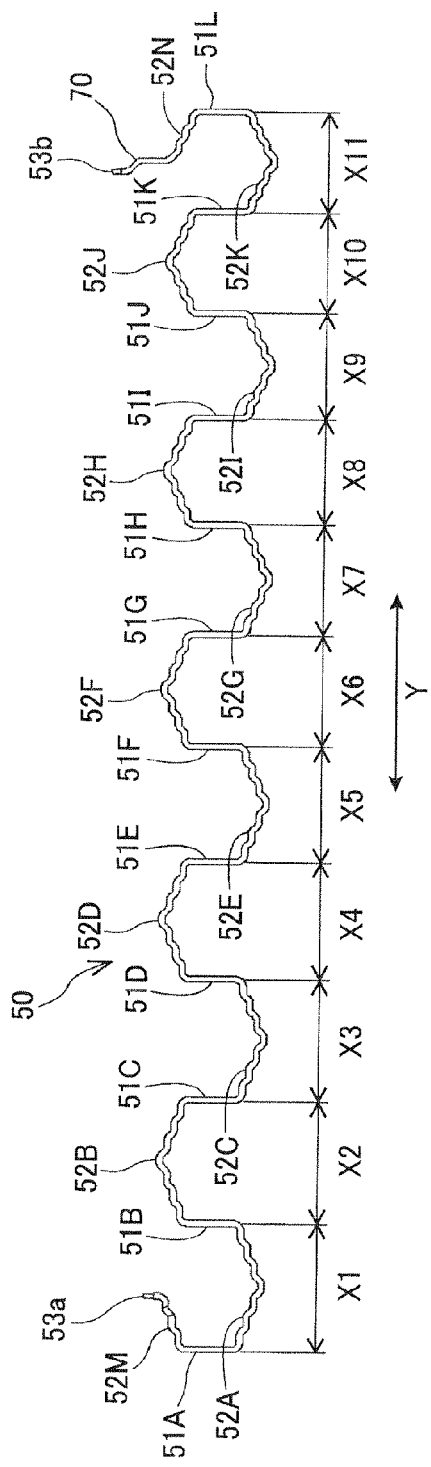
FIG. 11B is a front view of the one of the electric wires.

FIGS. 11A-11B together show the shape of each of the electric wires 50 before the electric wires 50 are rolled into a spiral shape as to be described later.

As shown in FIGS. 11A-11B, each of the electric wires 50 is substantially planar and wave-shaped to include a plurality of in-slot portions 51 and a plurality of turn portions 52. The in-slot portions 51 are spaced in the longitudinal direction Y of the electric wire 50 at predetermined pitches and extend perpendicular to the longitudinal direction Y. Each of the in-slot portions 51 is to be received in a corresponding one of the slots 31 of the stator core 30. Each of the turn portions 52 extends to connect a corresponding adjacent pair of the in-slot portions 51 and is to be located outside the slots 31 of the stator core 30.

Specifically, the plurality of in-slot portions 51 include, at least, a first in-slot portion 51A, a second in-slot portion 51B, and a third in-slot portion 51C. The first, second and third in-slot portions 51A, 51B, and 51C are to be respectively received in three different slots 31 of the stator core 30; the three slots 31 are circumferentially spaced at a pitch of six slots 31. On the other hand, the plurality of turn portions 52 include, at least, a first turn portion 52A and a second turn portion 52B. The first turn portion 52A connects the first and second in-slot portions 51A and 51B and is to be located on one axial side of the stator core 30 outside the slots 31. The second turn portion 52B connects the second and third in-slot portions 51B and 51C and is to be located on the other axial side of the stator core 30 outside the slots 31.

More specifically, in the present embodiment, as shown in FIGS. 11A-11B, the plurality of in-slot portions 51 include first to twelfth in-slot portions 51A-51L which are to be sequentially received in eight slots 31 that are circumferentially spaced at a pitch of six slots 31. In other words, the number of the in-slot portions 51 in each of the electric wires 50 is equal to 12. On the other hand, the plurality of turn portions 52 include first to eleventh turn portions 52A-52K which each connect a corresponding adjacent pair of the in-slot portions 51A-51L and are to be alternately located on the opposite axial sides of the stator core 30 outside the slots 31. In other words, the number of the turn portions 52 in each of the electric wires 50 is equal to 11.

Moreover, the predetermined pitches X between the in-slot portions 51A-51L in the longitudinal direction Y of the electric wire 50 gradually decrease in a direction from the first in-slot portion 51A to the twelfth in-slot portion 51L. That is, X1>X2>X3>X4>X5>X6>X7>X8>X9>X10>X11. In addition, the predetermined pitches X1-X11 are set based on the circumferential distances between the eight slots 31 of the stator core 30 in which the in-slot portions 51A-51L are to be received.

Each of the electric wires 50 further includes a pair of lead portions 53a and 53b that are respectively formed at opposite ends of the electric wire 50 for connecting the electric wire 50 with other electric wires 50. The lead portion 53a is connected to the first in-slot portion 51A via a half-turn portion 52M that extends from the first in-slot portion 51A to return inward (i.e., rightward in FIG. 11B) in the longitudinal direction Y of the electric wire 50. The length of the half-turn portion 52M is about half the length of the first turn portion 52A. Consequently, the lead portion 53a is offset inward (i.e., rightward in FIG. 11B) in the longitudinal direction Y from the first in-slot portion 51A by the length of the half-turn portion 52M. On the other hand, the lead portion 53b is connected to the twelfth in-slot portion 51L via a half-turn portion 52N that extends from the twelfth in-slot portion 51L to return inward (i.e., leftward in FIG. 11B) in the longitudinal direction Y of the electric wire 50. The length of the half-turn portion 52N is about half the length of the eleventh turn portion 52K. Consequently, the lead portion 53b is offset inward (i.e., leftward in FIG. 11B) in the longitudinal direction Y from the twelfth in-slot portion 51L by the length of the half-turn portion 52N. Further, the lead portion 53b is formed to include therein one of the crossover parts 70 described previously.

Furthermore, as shown in FIG. 11A, each of the turn portions 52 (i.e., 52A-52K) includes, substantially at the center thereof, a crank-shaped part 54 that is bent to offset the turn portion 52 in a direction perpendicular to both the longitudinal direction Y of the electric wire 50 and the extending direction of the in-slot portions 51. Consequently, with the crank-shaped parts 54, the electric wire 50 is stepped to successively offset the in-slot portions 51 in the direction perpendicular to both the longitudinal direction Y and the extending direction of the in-slot portions 51. It should be noted that the term "crank-shaped" is used here only for the purpose of describing the overall shape of the parts 54 and does not restrict the internal angles between adjacent sections of the parts 54 to 90°. In addition, each of the half-turn portions 52M and 52N has no crank-shaped part 54 formed therein.

Figure 12A:
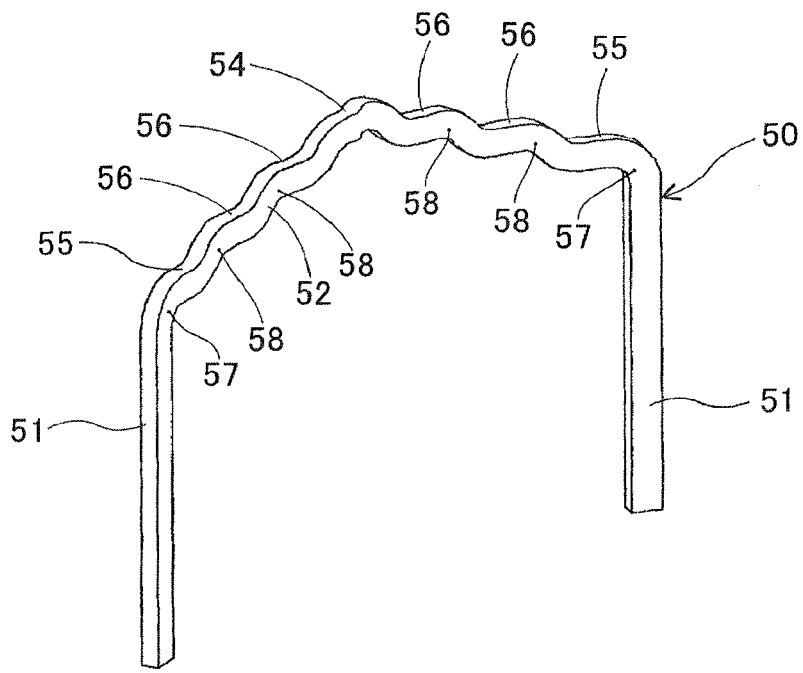
FIG. 12A is a perspective view illustrating a turn portion of one of the electric wires.
Figure 12B:
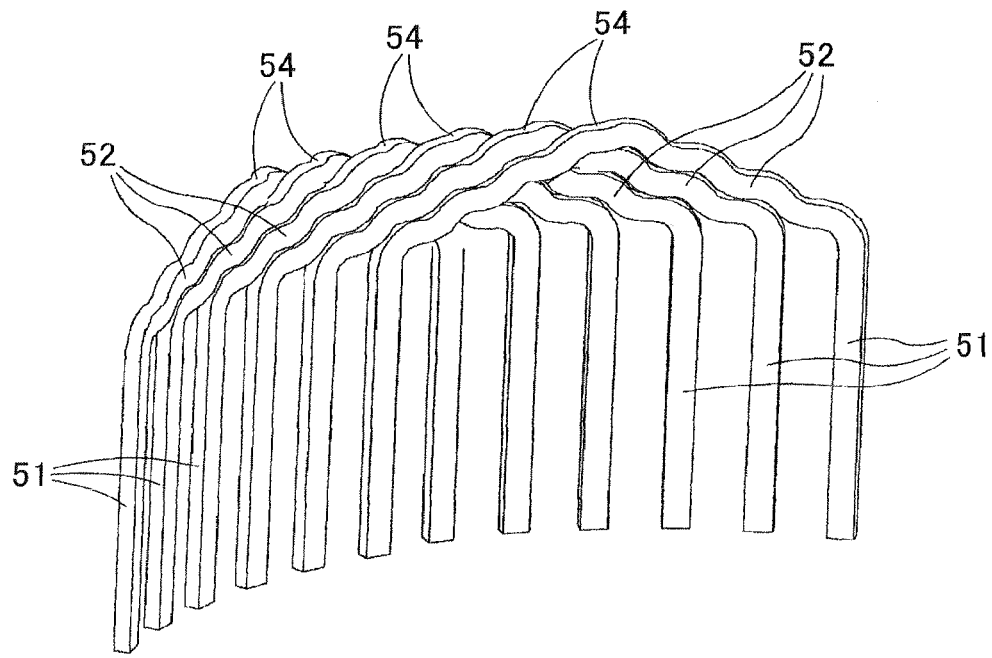
FIG. 12B is a perspective view illustrating a plurality of turn portions of the electric wires which are adjacent to one another.

Referring now to FIGS. 12A-12B, after forming the stator coil 40 with the electric wires 50 and assembling the stator core 30 to the stator coil 40, each of the turn portions 52 (i.e., 52A-52K) of the electric wires 50 is offset by the crank-shaped part 54 formed therein in a radial direction of the stator core 30. In addition, though not shown in FIGS. 12A-12B, each of the crank-shaped parts 54 formed in the turn portions 52 of the electric wires 50 extends parallel to a corresponding axial end face 30a of the stator core 30.

Further, in the present embodiment, the amount of radial offset made by each of the crank-shaped parts 54 is set to be equal to the radial thickness of the in-slot portions 51 of the electric wires 50. Here, the amount of radial offset made by each of the crank-shaped parts 54 is defined as the difference in radial position between the opposite ends of the crank-shaped part 54. Accordingly, for each of the electric wires 50, the difference in radial position between each adjacent pair of the in-slot portions 51, which are connected by a corresponding one of the turn portions 52, is equal to the radial thickness (i.e., thickness in the radial direction of the stator core 30) of the in-slot portions 51.

Setting the amount of radial offset as above, it is possible to arrange each adjacent pair of the turn portions 52 of the electric wires 50 in intimate contact with each other, as shown in FIG. 12B. As a result, the radial thickness of the coil end parts 42 of the stator coil 40 can be minimized. In addition, it is also possible to make each adjacent pair of the turn portions 52 of the electric wires 50 extend in the circumferential direction of the stator core 30 without interference therebetween.

Moreover, as shown in FIGS. 12A-12B, each of the turn portions 52 of the electric wires 50 includes a pair of shoulder parts 55 which respectively adjoin the pair of the in-slot portions 51 connected by the turn portion 52 and both extend substantially perpendicular to the pair of the in-slot portions 51 (or substantially parallel to the corresponding axial end face 30a of the stator core 30). Consequently, with the shoulder parts 55, the protruding height of each of the turn portions 52 from the corresponding axial end face 30a of the stator core 30 can be reduced. As a result, the axial length of the coil end parts 42 of the stator coil 40 can be reduced. In addition, the coil end parts 42 of the stator coil 40 are each comprised of those of the turn portions 52 of the electric wires 50 which are located on the same axial side of the stator core 30.

In the present embodiment, each of the shoulder parts 55 is bent at a substantially right angle to the adjoining in-slot portion 51, forming a bend between the shoulder part 55 and the adjoining in-slot portion 71. Further, a pair of bulges 57 are respectively formed on the radial end faces of the bend (see also FIGS. 23A-23C). The bulges 57 are located closer to the inside than the outside of the bend, and fall on an imaginary line that extends straight from the adjoining in-slot portion 51. The bulges 57 also protrude from the adjoining in-slot portion 51 radially inward and radially outward, respectively.

Furthermore, in the present embodiment, there is specified the following dimensional relationship: d1≦d2, where d1 is the length of each of the shoulder parts 55 of the electric wires 50 in the circumferential direction of the stator core 30 and d2 is the distance between each circumferentially-adjacent pair of the slots 31 of the stator core 30.

Specifying the above relationship, it is possible to prevent interference between each pair of the turn portions 52 of the electric wires 50 which respectively protrude from one circumferentially-adjacent pair of the slots 31 of the stator core 30. Consequently, it is possible to prevent both the axial length and radial thickness of the coil end parts 42 of the stator coil 40 from being increased for preventing the above-described interference.

Moreover, as shown in FIGS. 12A-12B, each of the turn portions 52 of the electric wires 50 further includes two shoulder parts 56 between the crank-shaped part 54 and each of the shoulder parts 55. Accordingly, each of the turn portions 52 of the electric wires 50 includes one crank-shaped part 54, two shoulder parts 55, and four shoulder parts 56. Each of the shoulder parts 56 extends, like the shoulder parts 55, substantially perpendicular to the in-slot portions 51 (or substantially parallel to the corresponding axial end face 30a of the stator core 30). Consequently, with the shoulder parts 56, the protruding height of each of the turn portions 52 from the corresponding axial end face 30a of the stator core 30 can be further reduced. As a result, the axial length of the coil end parts 42 of the stator coil 40 can be further reduced. In addition, each of the turn portions 52 of the electric wires 50 can be seen as being stepped on both sides of the crank-shaped part 54 to reduce its protruding height from the corresponding axial end face 30a of the stator core 30.

Further, for each of bends formed between the shoulder parts 55 and 56, there are formed a pair of bulges 58 respectively on the radial end faces of the bend. The bulges 58 are located closer to the inside than the outside of the bend, and protrude from the closest one of the in-slot portions 51 radially inward and radially outward, respectively.

In addition, each of the half-turn portions 52M and 52N of the electric wires 50 also has shoulder parts 55 and 56 and bulges 57 and 58 formed therein in the same manner as in the turn portions 52A-52K of the electric wires 50.

In the present embodiment, the stator coil 40 is formed with the 48 electric wires 50 as shown in FIGS. 11A-11B. It should be noted that the crossover parts 70 may be omitted from some of the electric wires 50 for facilitating the formation of the U-phase, V-phase, and W-phase output terminals and the U-phase, V-phase, and W-phase neutral terminals in the stator coil 40. However, in any cases, it is preferable that all of the electric wires 50 have the same shape at least between the lead portions 53a and 53b.

Figure 6:
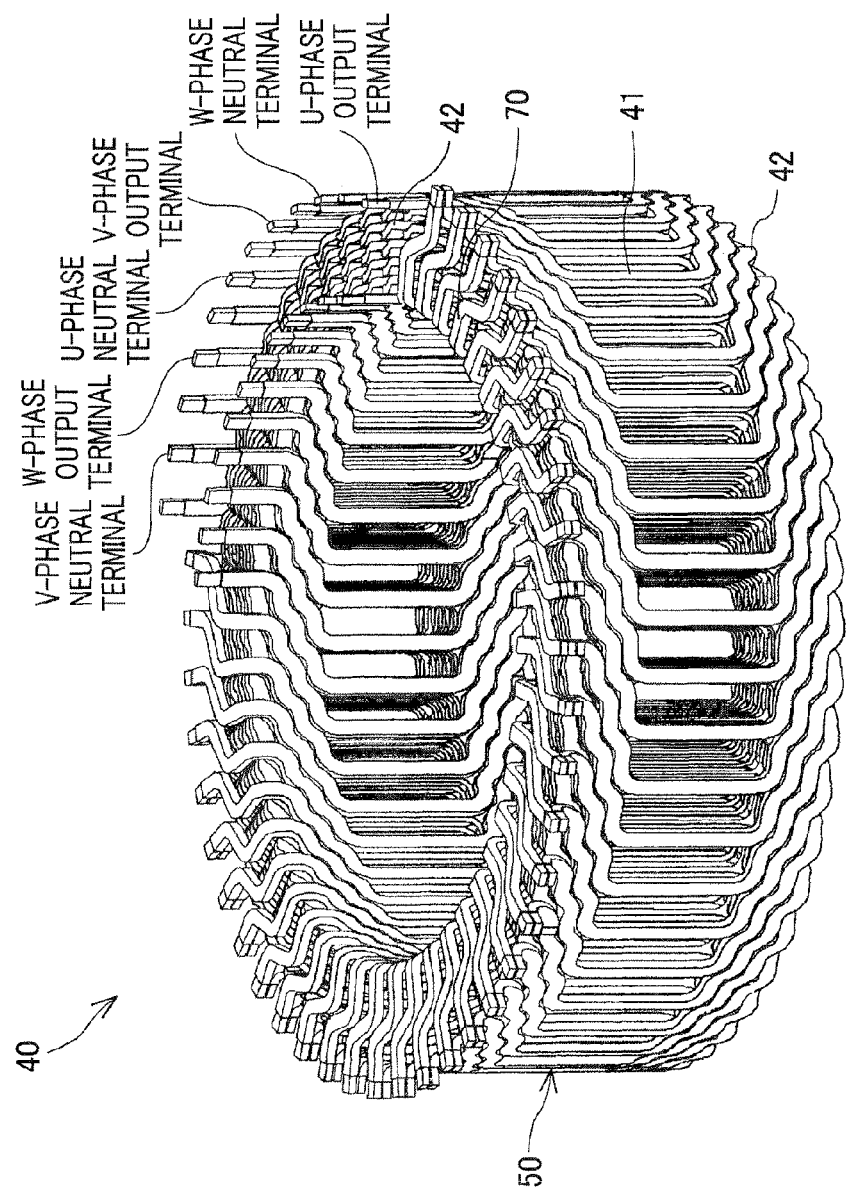
FIG. 6 is a perspective view of a stator coil of the stator.
Figure 7:
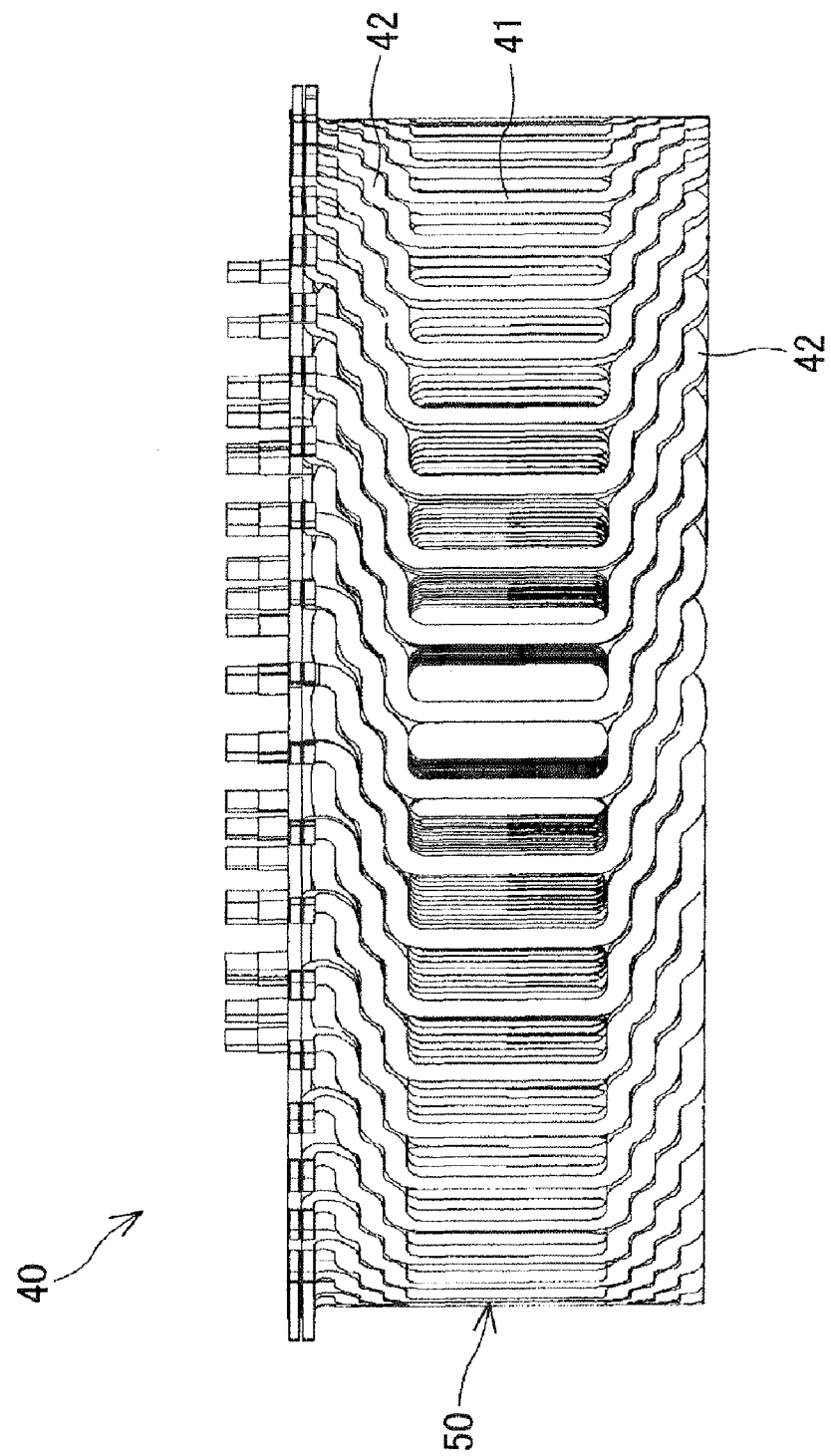
FIG. 7 is a side view of the stator coil.

As described previously, each of the turn portions 52 of the electric wires 50 includes, substantially at the center thereof, the crank-shaped part 54 by which the turn potion 52 is radially offset by the radial thickness of the in-slot portions 51. Accordingly, for each of the electric wires 50, the difference in radial position between each adjacent pair of the in-slot portions 51, which are connected by a corresponding one of the turn portions 52, is equal to the radial thickness of the in-slot portions 51. Moreover, for each of the electric wires 50, the first in-slot portion 51A is located most radially outward while the twelfth in-slot portion 51L is located most radially inward; the predetermined pitches X between the in-slot portions 51A-51L gradually decrease in a direction from the first in-slot portion 51A to the twelfth in-slot portion 51L (see FIG. 11B). Consequently, those of the in-slot portions 51 of the electric wires 50 which are stacked in a radial direction of the stator coil 40 (or a radial direction of the stator core 30) can be aligned straight in the radial direction, thereby allowing the stator coil 40 to have a substantially perfect hollow-cylindrical shape as shown in FIGS. 6 and 7.

Furthermore, all of the ith in-slot portions 51 of the 48 electric wires 50 are located respectively in the 48 slots 31 of the stator core 30 at the same radial position, where i=1, 2, . . . , 12. For example, all of the first in-slot portions 51A of the 48 electric wires 50 are located respectively in the 48 slots 31 and positioned most radially outward in the respective slots 31; all of the twelfth in-slot portions 51L of the 48 electric wires 50 are located respectively in the 48 slots 31 and positioned most radially inward in the respective slots 31. With the above location of the in-slot portions 51 of the electric wires 50, both the outside and inside diameters of the stator coil 40 can be made uniform in the circumferential direction of the stator core 30.

Figure 13:
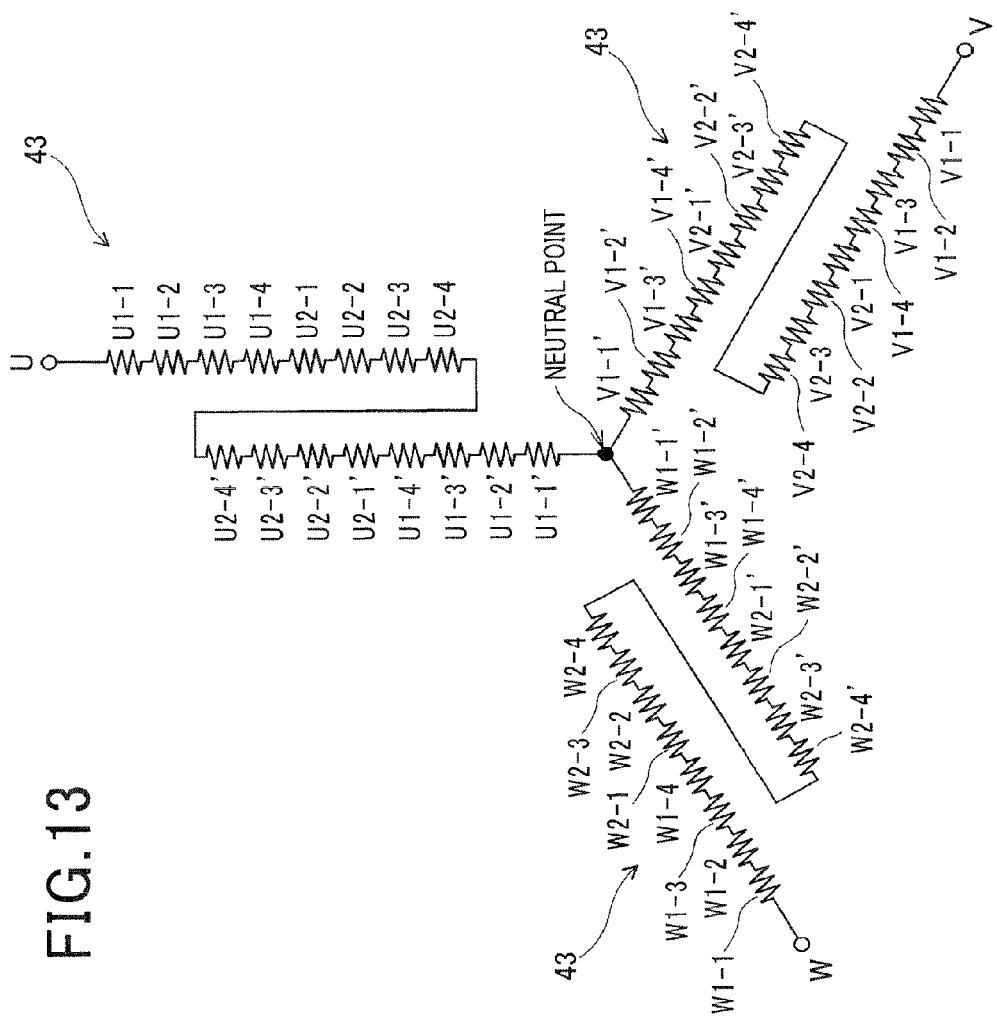
FIG. 13 is a circuit diagram of the stator coil.

In the present embodiment, as shown in FIG. 13, the stator coil 40 is formed as a three-phase coil which is comprised of three phase windings (i.e., U-phase, V-phase, and W-phase windings) 43. Each of the U-phase, V-phase, and W-phase windings 43 is formed by serially connecting 16 electric wires 50. Further, the U-phase output and neutral terminals are respectively formed at the opposite ends of the U-phase winding 43; the V-phase output and neutral terminals are respectively formed at the opposite ends of the V-phase winding 43; and the W-phase output and neutral terminals are respectively formed at the opposite ends of the W-phase winding 43. Furthermore, the U-phase, V-phase, and W-phase windings 43 are Y-connected to define a neutral point therebetween. That is, the U-phase, V-phase, and W-phase neutral terminals of the U-phase, V-phase, and W-phase windings 43 are joined together at the neutral point. Consequently, three-phase AC power is input to or output from the stator coil 40 via the U-phase, V-phase, and W-phase output terminals.

Figure 14:
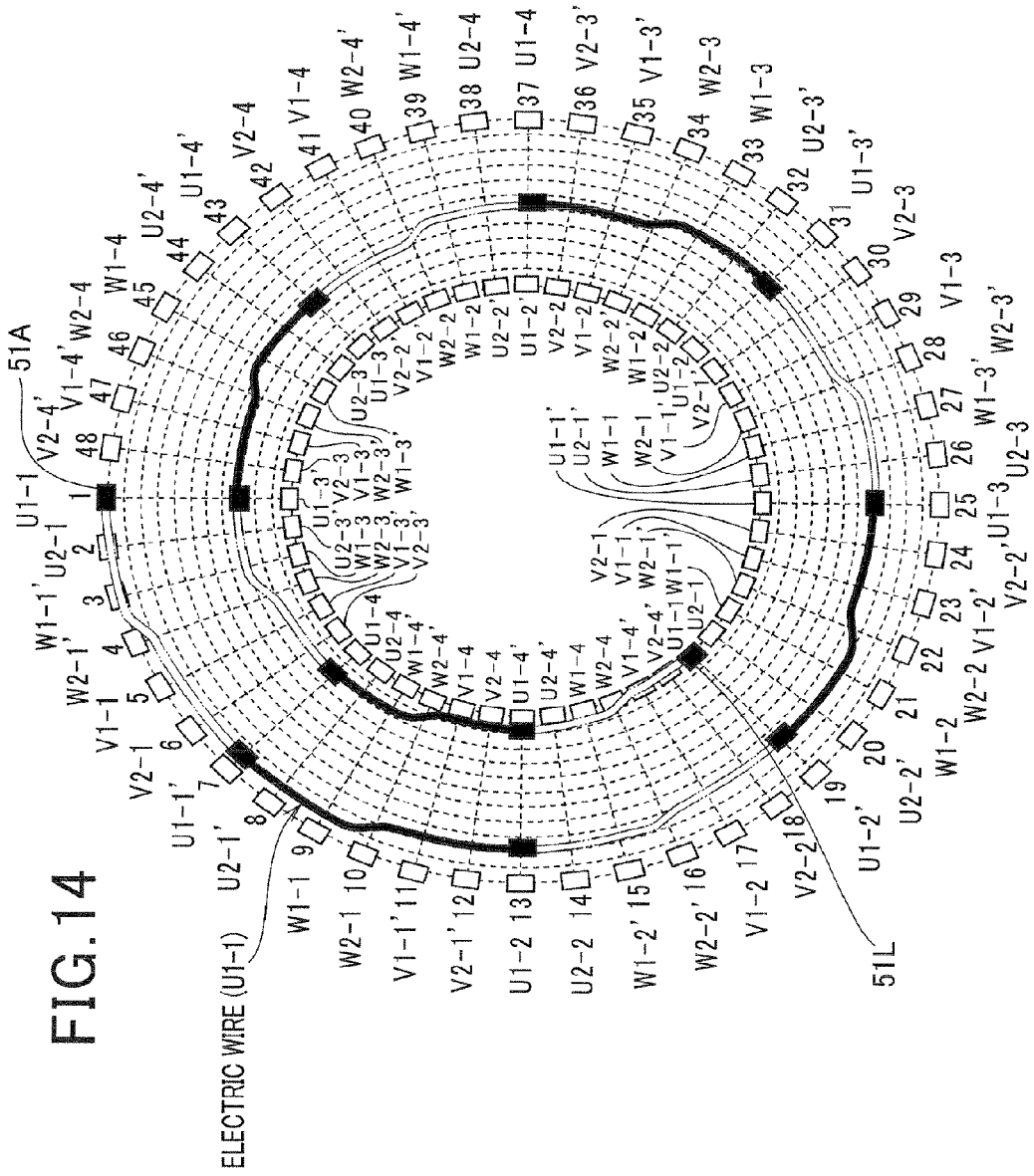
FIG. 14 is a schematic view illustrating the location of the radially-outermost in-slot portion of each of the electric wires in the stator core.
Figure 15:
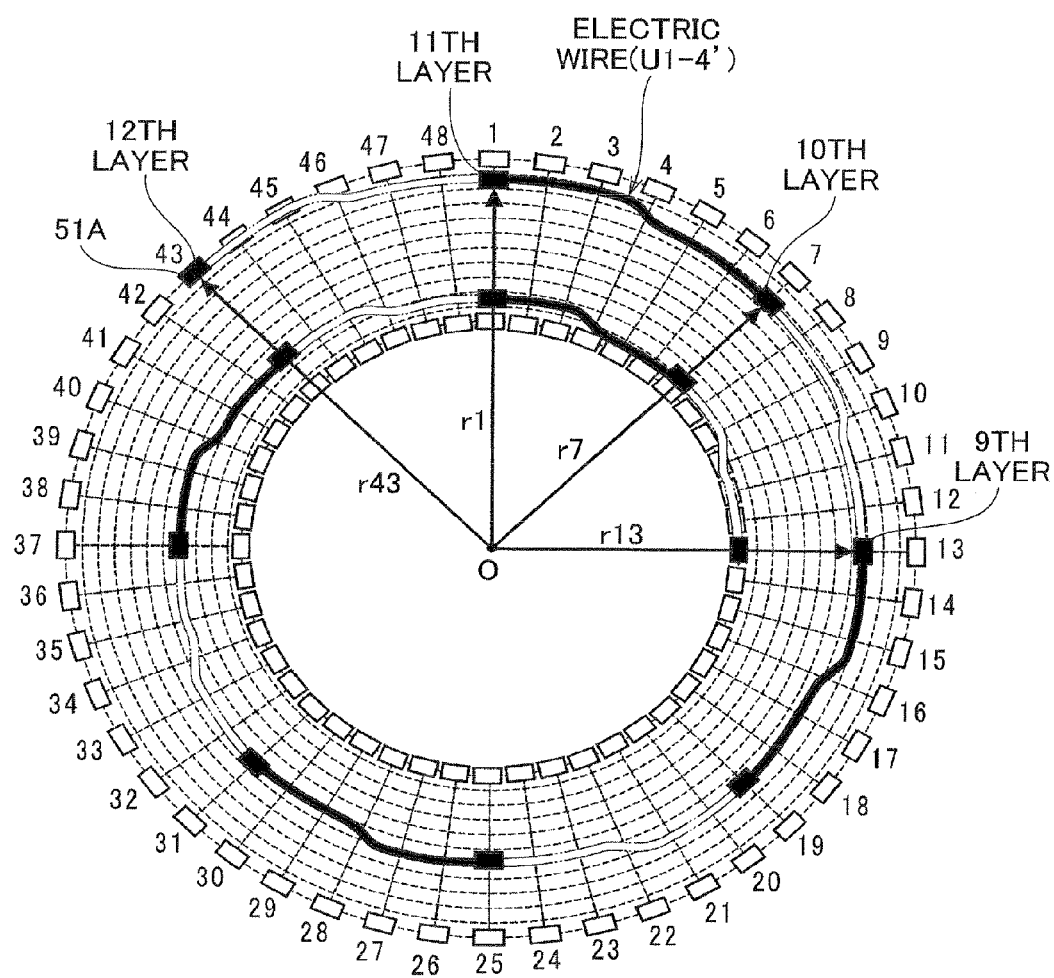
FIG. 15 is a schematic view illustrating the manner of extension of the electric wire labeled (U1-4') when viewed along the longitudinal axis O of the stator core.

In FIGS. 14 and 15, the intersections between 12 dashed-line circles and 48 radially-extending dashed lines represent the positions of the in-slot portions 51 of the electric wires 50. In addition, among the positions of the in-slot portions 51, only the radially outermost and radially innermost ones are denoted by rectangles.

It can be seen from FIGS. 14 and 15 that in the present embodiment, in each of the slots 31 of the stator core 30, the in-slot portions 51 of the electric wires 50 are radially stacked in 12 layers.

Further, in FIGS. 14 and 15, the numbers 1-48 of the slots 31 of the stator core 30 are respectively shown radially outside the 48 radially-extending dashed lines. In addition, in FIG. 14, each of the 48 electric wires 50 is labeled radially outside the slot 31 in which the first in-slot portion 51A of the electric wire 50 is located most radially outward (i.e., located at the twelfth layer in the slot 31); each of the 48 electric wires 50 is also labeled radially inside the slot 31 in which the twelfth in-slot portion 51L of the electric wire 50 is located most radially inward (i.e., located at the first layer in the slot 31).

In the present embodiment, each of the U-phase, V-phase, and W-phase windings 43 of the stator coil 40 is formed with first and second electric wire groups each consisting of eight electric wires 50. The in-slot portions 51 of the electric wires 50 of the first group are received in eight common slots 31 of the stator core 30. Similarly, the in-slot portions 51 of the electric wires 50 of the second group are also received in another eight common slots 31 of the stator core 30. That is, the in-slot portions 51 of the electric wires 50 of the first group are received in different slots 31 from the in-slot portions 51 of the electric wires 50 of the second group.

For example, the U-phase winding 43 is formed with a first electric wire group, which consists of the electric wires 50 labeled (U1-1) to (U1-4) and (U1-1') to (U1-4'), and a second electric wire group that consists of the electric wires 50 labeled (U2-1) to (U2-4) and (U2-1') to (U2-4'). The in-slot portions 51 of the (U1-1) to (U1-4) and (U1-1') to (U1-4') electric wires 50 are received in the Nos. 1, 7, 13, 19, 25, 31, 37, and 43 slots 31 of the stator core 30. On the other hand, the in-slot portions 51 of the (U2-1) to (U2-4) and (U2-1') to (U2-4') electric wires 50 are received in the Nos. 2, 8, 14, 20, 26, 32, 38, and 44 slots 31 of the stator core 30.

FIG. 14 illustrates, from one axial side of the stator core 30, the arrangement of each of the 48 electric wires 50 by taking the (U1-1) electric wire 50 as an example. Specifically, in FIG. 14, the positions of the in-slot portions 51 of the (U1-1) electric wire 50 are denoted by black rectangles; those of the turn portions 52 of the (U1-1) electric wire 50 which are located on the one axial side of the stator core 30 (i.e., on the front side of the paper surface of FIG. 14) are denoted by circumferentially-extending heavy lines; and those of the turn portions 52 of the (U1-1) electric wire 50 which are located on the other axial side of the stator core 30 (i.e., on the rear side of the paper surface of FIG. 14) are denoted by circumferentially-extending two-dot dashed lines. As seen from FIG. 14, for the (U1-1) electric wire 50, the first in-slot portion 51A is located at the twelfth layer (i.e., the radially outermost layer) in the No. 1 slot 31; the twelfth in-slot portion 51L is located at the first layer (i.e., the radially innermost layer) in the No. 19 slot 31; the first to the twelfth in-slot portions 51A-51L are circumferentially spaced at a six-slot pitch; and the radial positions of the in-slot portions 51A-51L are successively offset radially inward by one layer each time.

FIG. 15 illustrates, from the other axial side of the stator core 30, the arrangement of each of the 48 electric wires 50 by taking the (U1-4') electric wire 50 as an example. Specifically, in FIG. 15, the positions of the in-slot portions 51 of the (U1-4') electric wire 50 are denoted by black rectangles; those of the turn portions 52 of the (U1-4') electric wire 50 which are located on the other axial side of the stator core 30 (i.e., on the front side of the paper surface of FIG. 15) are denoted by circumferentially-extending heavy lines; and those of the turn portions 52 of the (U1-4') electric wire 50 which are located on the one axial side of the stator core 30 (i.e., on the rear side of the paper surface of FIG. 15) are denoted by circumferentially-extending two-dot dashed lines. As seen from FIG. 15, for the (U1-4') electric wire 50, the first in-slot portion 51A is located at the twelfth layer in the No. 43 slot 31; the twelfth in-slot portion 51L is located at the first layer in the No. 13 slot 31; the first to the twelfth in-slot portions 51A-51L are circumferentially spaced at a six-slot pitch; and the radial positions of the in-slot portions 51A-51L are successively offset by one layer each time.

As described previously, in the present embodiment, the stator core 30 has the 48 slots 31 formed therein, while the stator coil 40 is formed with the 48 electric wires 50. The electric wires 50 are mounted on the stator core 30 so that they are offset from one another in the circumferential direction of the stator core 30 by one slot pitch of the stator core 30. Consequently, the first in-slot portions 51A of the 48 electric wires 50 are respectively located at the radially outermost layers (i.e., the twelfth layers) in the 48 slots 31; the twelfth in-slot portions 51L of the 48 electric wires 50 are respectively located at the radially innermost layers (i.e., the first layers) in the 48 slots 31.

FIG. 16 shows both the label of the electric wire 50 located at the radially outermost layer and the label of the electric wire 50 located at the radially innermost layer in each of the slots 31 of the stator core 30.

In the present embodiment, for each of the 48 electric wires 50 forming the stator coil 40, the radial distances from the axis O of the stator core 30 to the in-slot portions 51 of the electric wire 50 successively decrease in the sequence from the first in-slot portion 51A to the twelfth in-slot portion 51L. Moreover, for each of the 48 electric wires 50, the difference in radial distance from the axis O of the stator core 30 between each adjacent pair of the in-slot portions 51, which are connected by a corresponding one of the turn portions 52, is equal to the radial thickness of the in-slot portions 51.

For example, referring back to FIG. 15, for the (U1-4') electric wire 50, there is satisfied the following relationship: r43>r1>r7>r13. Here, r43 represents the radial distance from the axis O of the stator core 30 to the first in-slot portion 51A that is located at the twelfth layer in the No. 43 slot 31; r1 represents the radial distance from the axis O to the second in-slot portion 51B that is located at the eleventh layer in the No. 1 slot 31; r7 represents the radial distance from the axis O to the third in-slot portion 51C that is located at the tenth layer in the No. 7 slot 31; and r13 represents the radial distance from the axis O to the fourth in-slot portion 51D that is located at the ninth layer in the No. 13 slot 31. Further, the radial distances r43, r1, r7, and r13 successively decrease in decrements of the radial thickness of the in-slot portions 51.

Figure 17:
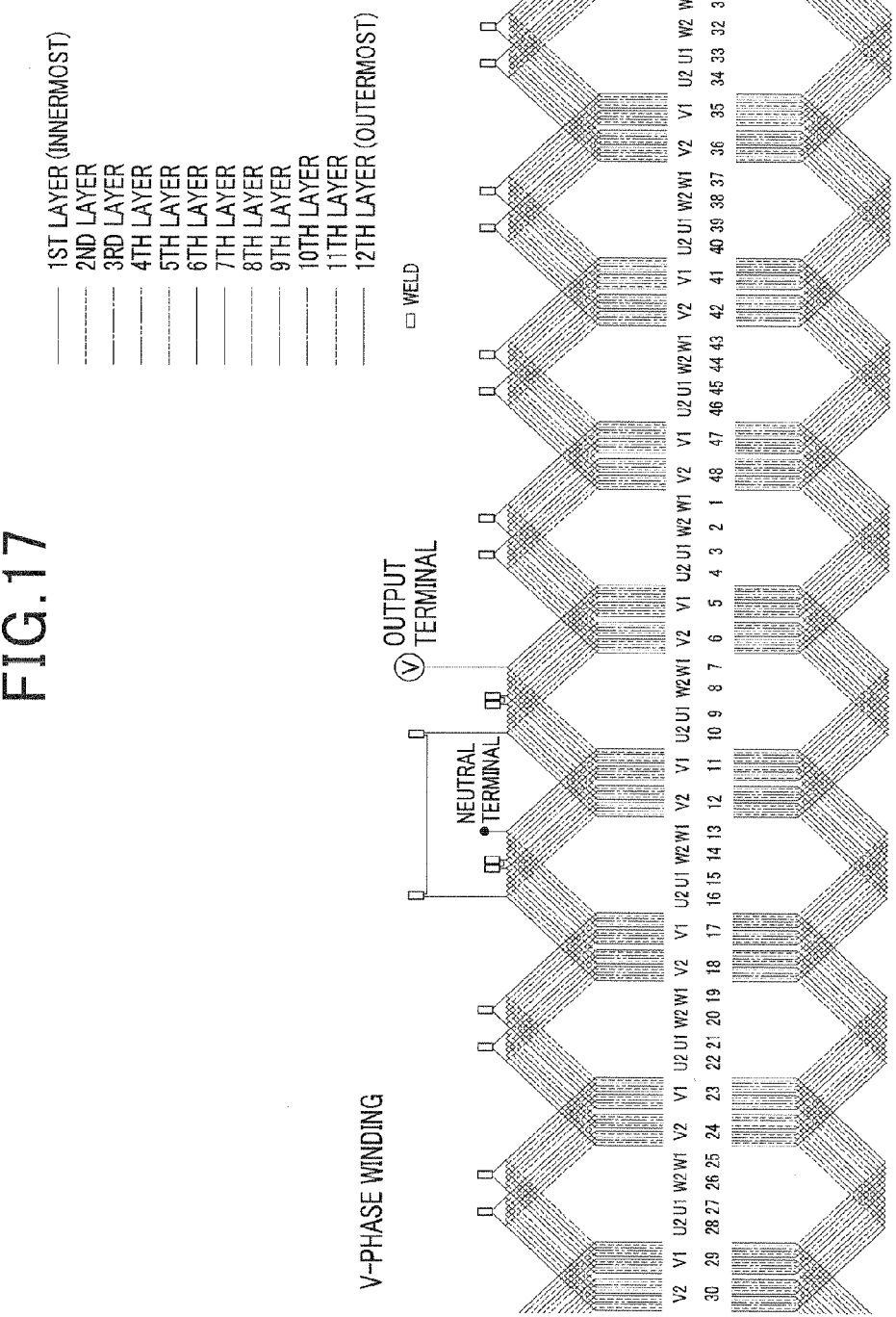
FIG. 17 is a schematic view illustrating the connection between those of the electric wires which together form a V-phase winding of the stator coil when viewed from the radially inner side of the stator core.

Next, with reference to FIGS. 13 and 16-17, the manner of serially connecting the 16 electric wires 50 for forming the V-phase winding 43 of the stator coil 40 will be described. In addition, it should be noted that the electric wires 50 for forming the U-phase and W-phase windings 43 of the stator coil 40 are also connected in the same manner as those for forming the V-phase winding 43.

As shown in FIG. 13, the V-phase winding 43 is formed by serially connecting the (V1-1) to (V1-4), (V1-1') to (V1-4'), (V2-1) to (V2-4), and (V2-1') to (V2-4') electric wires 50.

Specifically, to the V-phase output terminal, there is connected the first in-slot portion 51A-side end of the (V1-1) electric wire 50. Moreover, as shown in FIGS. 16 and 17, for the (V1-1) electric wire 50, the first in-slot portion 51A is located at the radially outermost layer (i.e., the twelfth layer) in the No. 5 slot 31 of the stator core 30, while the twelfth in-slot portion 51L is located at the radially innermost layer (i.e., the first layer) in the No. 23 slot 31.

To the twelfth in-slot portion 51L-side end of the (V1-1) electric wire 50, there is connected the first in-slot portion 51A-side end of the (V1-2) electric wire 50. Moreover, for the (V1-2) electric wire 50, the first in-slot portion 51A is located at the radially outermost layer in the No. 17 slot 31, while the twelfth in-slot portion 51L is located at the radially innermost layer in the No. 35 slot 31.

To the twelfth in-slot portion 51L-side end of the (V1-2) electric wire 50, there is connected the first in-slot portion 51A-side end of the (V1-3) electric wire 50. Moreover, for the (V1-3) electric wire 50, the first in-slot portion 51A is located at the radially outermost layer in the No. 29 slot 31, while the twelfth in-slot portion 51L is located at the radially innermost layer in the No. 47 slot 31.

To the twelfth in-slot portion 51L-side end of the (V1-3) electric wire 50, there is connected the first in-slot portion 51A-side end of the (V1-4) electric wire 50. Moreover, for the (V1-4) electric wire 50, the first in-slot portion 51A is located at the radially outermost layer in the No. 41 slot 31, while the twelfth in-slot portion 51L is located at the radially innermost layer in the No. 11 slot 31.

To the twelfth in-slot portion 51L-side end of the (V1-4) electric wire 50, there is connected the first in-slot portion 51A-side end of the (V2-1) electric wire 50. Moreover, for the (V2-1) electric wire 50, the first in-slot portion 51A is located at the radially outermost layer in the No. 6 slot 31, while the twelfth in-slot portion 51L is located at the radially innermost layer in the No. 24 slot 31.

To the twelfth in-slot portion 51L-side end of the (V2-1) electric wire 50, there is connected the first in-slot portion 51A-side end of the (V2-2) electric wire 50. Moreover, for the (V2-2) electric wire 50, the first in-slot portion 51A is located at the radially outermost layer in the No. 18 slot 31, while the twelfth in-slot portion 51L is located at the radially innermost layer in the No. 36 slot 31.

To the twelfth in-slot portion 51L-side end of the (V2-2) electric wire 50, there is connected the first in-slot portion 51A-side end of the (V2-3) electric wire 50. Moreover, for the (V2-3) electric wire 50, the first in-slot portion 51A is located at the radially outermost layer in the No. 30 slot 31, while the twelfth in-slot portion 51L is located at the radially innermost layer in the No. 48 slot 31.

To the twelfth in-slot portion 51L-side end of the (V2-3) electric wire 50, there is connected the first in-slot portion 51A-side end of the (V2-4) electric wire 50. Moreover, for the (V2-4) electric wire 50, the first in-slot portion 51A is located at the radially outermost layer in the No. 42 slot 31, while the twelfth in-slot portion 51L is located at the radially innermost layer in the No. 12 slot 31.

To the twelfth in-slot portion 51L-side end of the (V2-4) electric wire 50, there is connected the twelfth in-slot portion 51L-side end of the (V2-4') electric wire 50. Moreover, for the (V2-4') electric wire 50, the first in-slot portion 51A is located at the radially outermost layer in the No. 48 slot 31, while the twelfth in-slot portion 51L is located at the radially innermost layer in the No. 18 slot 31.

To the first in-slot portion 51A-side end of the (V2-4') electric wire 50, there is connected the twelfth in-slot portion 51L-side end of the (V2-3') electric wire 50. Moreover, for the (V2-3') electric wire 50, the first in-slot portion 51A is located at the radially outermost layer in the No. 36 slot 31, while the twelfth in-slot portion 51L is located at the radially innermost layer in the No. 6 slot 31.

To the first in-slot portion 51A-side end of the (V2-3') electric wire 50, there is connected the twelfth in-slot portion 51L-side end of the (V2-2') electric wire 50. Moreover, for the (V2-2') electric wire 50, the first in-slot portion 51A is located at the radially outermost layer in the No. 24 slot 31, while the twelfth in-slot portion 51L is located at the radially innermost layer in the No. 42 slot 31.

To the first in-slot portion 51A-side end of the (V2-2') electric wire 50, there is connected the twelfth in-slot portion 51L-side end of the (V2-1') electric wire 50. Moreover, for the (V2-1') electric wire 50, the first in-slot portion 51A is located at the radially outermost layer in the No. 12 slot 31, while the twelfth in-slot portion 51L is located at the radially innermost layer in the No. 30 slot 31.

To the first in-slot portion 51A-side end of the (V2-1') electric wire 50, there is connected the twelfth in-slot portion 51L-side end of the (V1-4') electric wire 50. Moreover, for the (V1-4') electric wire 50, the first in-slot portion 51A is located at the radially outermost layer in the No. 47 slot 31, while the twelfth in-slot portion 51L is located at the radially innermost layer in the No. 17 slot 31.

To the first in-slot portion 51A-side end of the (V1-4') electric wire 50, there is connected the twelfth in-slot portion 51L-side end of the (V1-3') electric wire 50. Moreover, for the (V1-3') electric wire 50, the first in-slot portion 51A is located at the radially outermost layer in the No. 35 slot 31, while the twelfth in-slot portion 51L is located at the radially innermost layer in the No. 5 slot 31.

To the first in-slot portion 51A-side end of the (V1-3') electric wire 50, there is connected the twelfth in-slot portion 51L-side end of the (V1-2') electric wire 50. Moreover, for the (V1-2') electric wire 50, the first in-slot portion 51A is located at the radially outermost layer in the No. 23 slot 31, while the twelfth in-slot portion 51L is located at the radially innermost layer in the No. 41 slot 31.

To the first in-slot portion 51A-side end of the (V1-2') electric wire 50, there is connected the twelfth in-slot portion 51L-side end of the (V1-1') electric wire 50. Moreover, for the (V1-1') electric wire 50, the first in-slot portion 51A is located at the radially outermost layer in the No. 11 slot 31, while the twelfth in-slot portion 51L is located at the radially innermost layer in the No. 29 slot 31. In addition, the first in-slot portion 51A-side end of the (V1-1') electric wire 50 is connected to the V-phase neutral terminal of the stator coil 40.

Further, as described previously, each of the electric wires 50 has the lead portion 53a formed at the first in-slot portion 51A-side end thereof and the lead portion 53b formed at the twelfth in-slot portion 51L-side end thereof (see FIGS. 11A-11B). The lead portion 53a is connected to the first in-slot portion 51A via the half-turn portion 52M, and the lead portion 53b is connected to the twelfth in-slot portion 51L via the half-turn portion 52N. The lead portion 53b also has the crossover part 70 formed therein. In the present embodiment, the connection between the electric wires 50 is made by welding corresponding pairs of the lead portions 53a and 53b of the electric wires 50.

For example, the (V1-1) electric wire 50 has the first in-slot portion 51A located at the radially outermost layer in the No. 5 slot 31 of the stator core 30 and the twelfth in-slot portion 51L located at the radially innermost layer in the No. 23 slot 31. The lead portion 53b of the (V1-1) electric wire 50 is offset, by the length of the half-turn portion 52N in the circumferential direction of the stator core 30, from the No. 23 slot 31 to the vicinity of the No. 20 slot 31. On the other hand, the (V1-2) electric wire 50 has the first in-slot portion 51A located at the radially outermost layer in the No. 17 slot 31 and the twelfth in-slot portion 51L located at the radially innermost layer in the No. 35 slot 31. The lead portion 53a of the (V1-2) electric wire 50 is offset, by the length of the half-turn portion 52M in the circumferential direction of the stator core 30, from the No. 17 slot 31 to the vicinity of the No. 20 slot 31. Further, as shown in FIGS. 6-9, the lead portion 53b of the (V1-1) electric wire 50 is bent radially outward at a substantially right angle to extend from the radially inner periphery of the stator coil 40 to the lead portion 53a of the (V1-2) electric wire 50 which is located on the radially outer periphery of the stator coil 40; then, the lead portion 53b of the (V1-1) electric wire 50 is welded to the lead portion 53a of the (V1-2) electric wire 50. In other words, the twelfth in-slot portion 51L-side end of the (V1-1) electric wire 50 is joined to the first in-slot portion 51A-side end of the (V1-2) electric wire 50 by welding.

Moreover, in the present embodiment, all of the corresponding pairs of the lead portions 53a and 53b of the electric wires 50 are welded radially outside the radially outermost turn portions 52 of the electric wires 50. To this end, each of the lead portions 53b of the electric wires 50 is configured to include the crossover part 70 that crosses over the annular axial end face of the stator coil 40 (more specifically, the annular axial end face of the coil end part 42 of the stator coil 40 which is comprised of the turn portions 52 of the electric wires 50) from the radially inside to the radially outside of the axial end face. Consequently, it is possible to reliably prevent the twelfth in-slot portions 51L of the electric wires 50, which are located most radially inward in the slots 31 of the stator core 30, from protruding radially inward. As a result, it is possible to reliably prevent the stator coil 40 from interfering with the rotor of the electric rotating machine which is located radially inside the stator 20.

Figure 8:
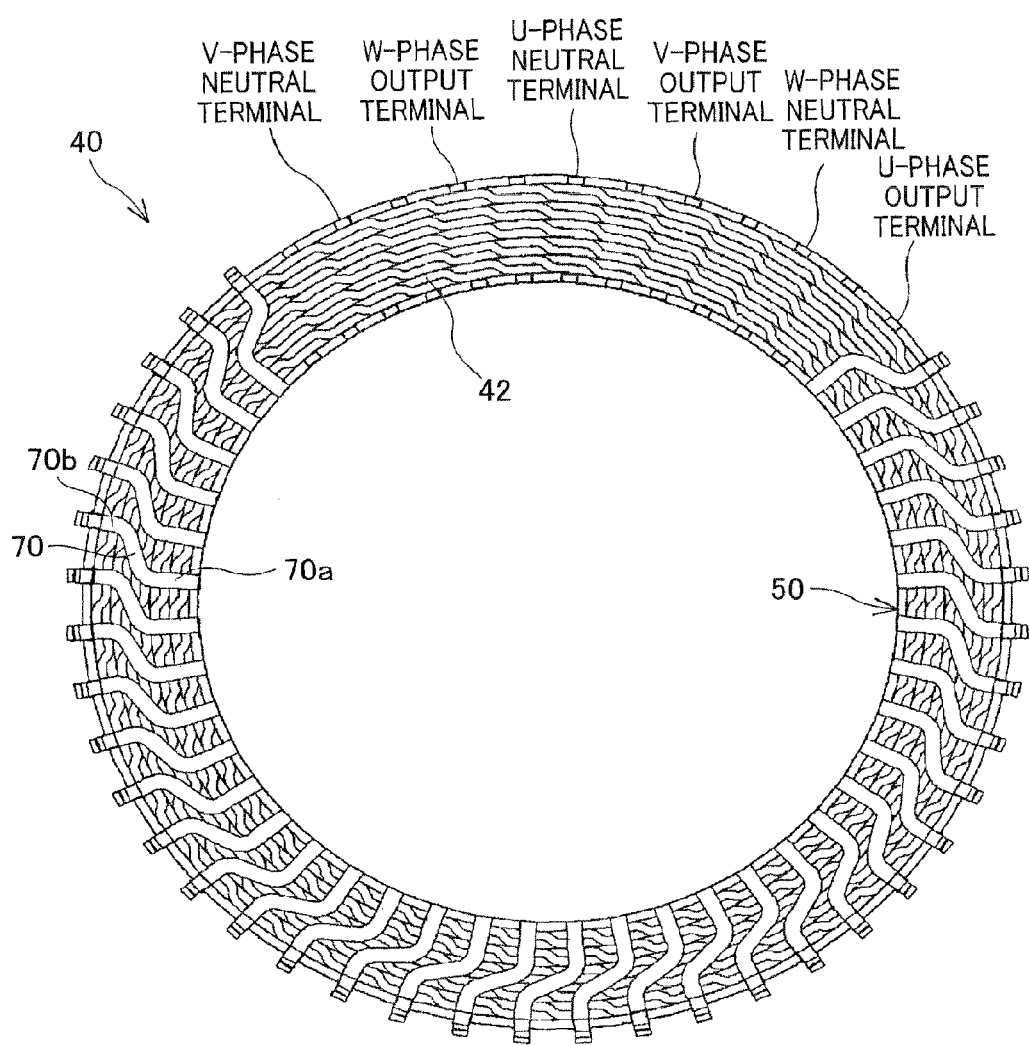
FIG. 8 is a top view of the stator coil.
Figure 9:
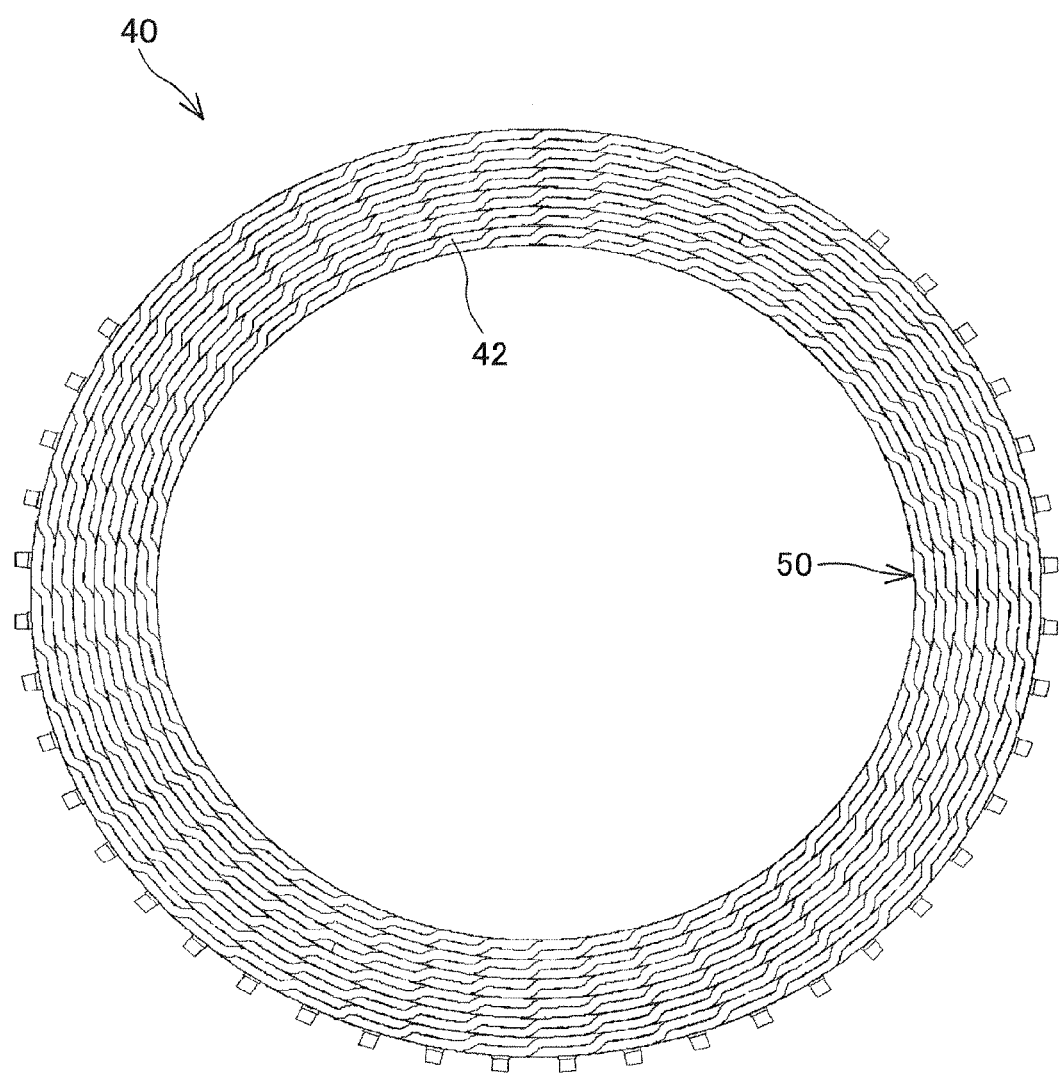
FIG. 9 is a bottom view of the stator coil.

Furthermore, in the present embodiment, as shown in FIG. 8, each of the crossover parts 70 of the electric wires 50 is crank-shaped to include a pair of radially-extending end sections 70a and 70b. With such a shape, it is possible to facilitate the bending of the lead portions 53b of the electric wires 50 for forming the crossover parts 70 and the welding of the corresponding pairs of the lead portions 53a and 53b of the electric wires 50.

In addition, as shown in FIGS. 6 and 8, on the annular axial end face of the stator coil 40, the crossover parts 70 occupy substantially ¾ of the full angular range of the axial end face; the full angular range is 360°. Further, within the remaining ¼ of the full angular range, there are sequentially arranged the V-phase neutral terminal, the W-phase output terminal, the U-phase neutral terminal, the V-phase output terminal, the W-phase neutral terminal, and the U-phase output terminal of the stator coil 40. That is, on the axial end face of the stator coil 40, the U-phase, V-phase, and W-phase output terminals are arranged in the same angular range as the U-phase, V-phase, and W-phase neutral terminals; the crossover parts 70 are arranged in a different angular range from the U-phase, V-phase, and W-phase output terminals and the U-phase, V-phase, and W-phase neutral terminals.

The stator core 30 is assembled to the above-described stator coil 40 by inserting the tooth portions 33 of the stator core segments 32 respectively into the spaces formed between the stacks of the in-slot portions 51 of the electric wires 50 from the radially outside of the stator coil 40. Consequently, each of the in-slot portions 51 of the electric wires 50 forming the stator coil 40 is received in a corresponding one of the slots 31 of the stator core 30. More specifically, for each of the electric wires 50, each adjacent pair of the in-slot portions 51 are respectively received in a corresponding pair of the slots 31 of the stator core 30 which are circumferentially spaced at a six-slot pitch. Moreover, each of the turn portions 52, which connects a corresponding adjacent pair of the in-slot portions 51, protrudes from a corresponding one of the axial end faces 30a of the stator core 30.

After having described the configuration of the stator 20 according to the present embodiment, a method of manufacturing the stator 20 will be described hereinafter.

Figure 18:
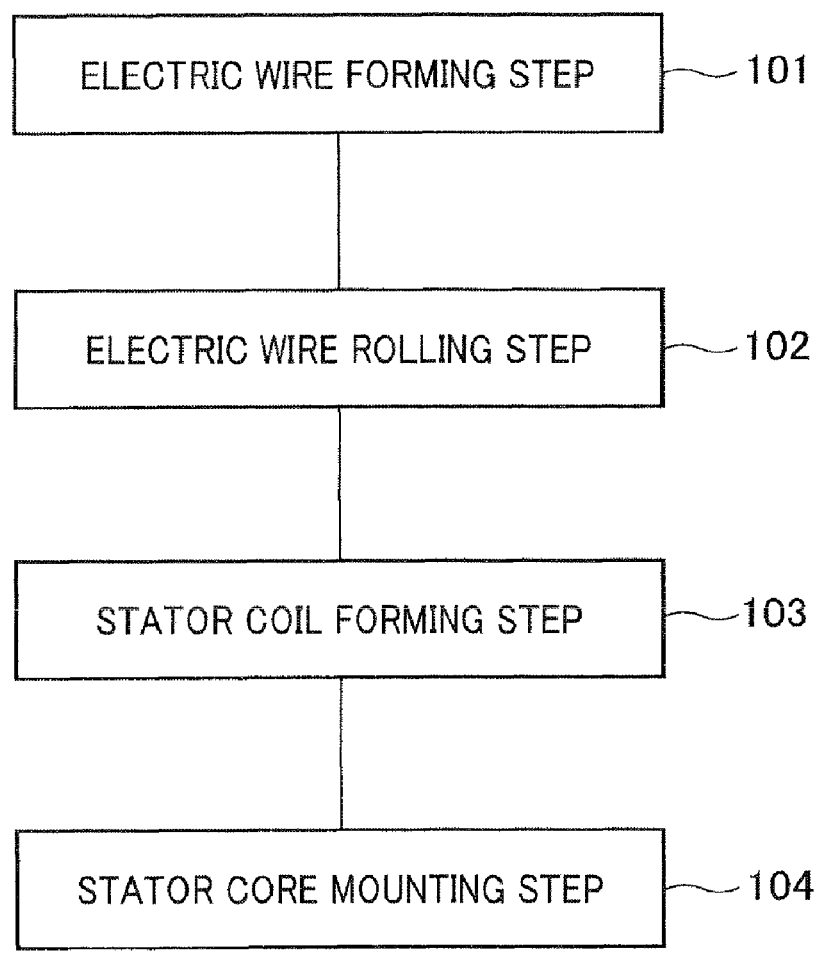
FIG. 18 is a flow chart illustrating a method, according to the embodiment, of manufacturing the stator.

Referring to FIG. 18, in the present embodiment, the method of manufacturing the stator 20 includes an electric wire forming step 101, an electric wire rolling step 102, a stator coil forming step 103, and a stator core mounting step 104.

First, in the electric wire forming step 101, the substantially planar, wave-shaped electric wires 50 as shown in FIGS. 11A-11B are formed by shaping a plurality (e.g., 48 in the present embodiment) of electric wire materials 50a.

Figure 19:
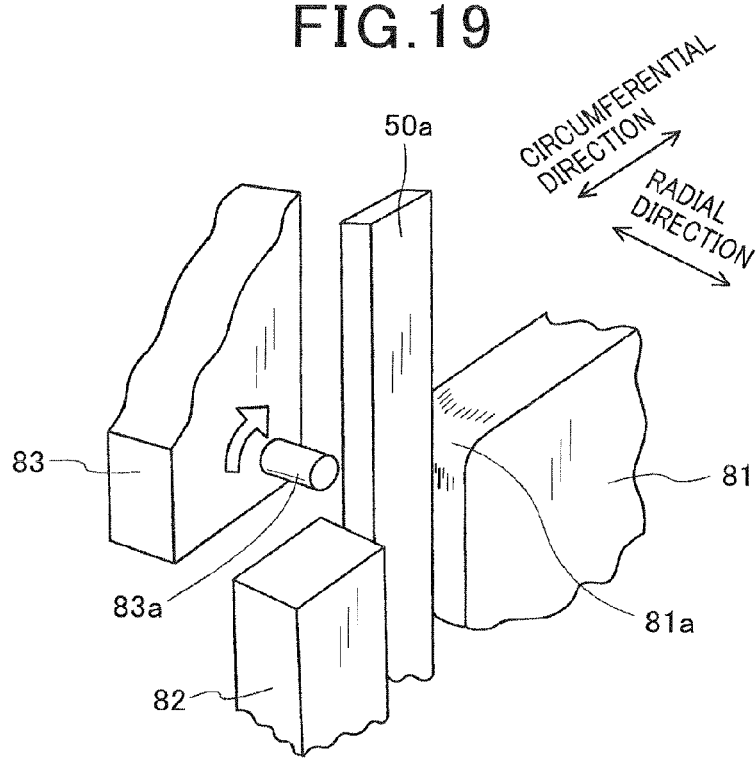
FIG. 19 is a perspective view illustrating an electric wire forming step of the method.
Figure 20A:
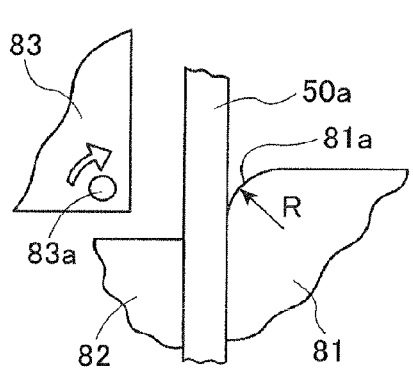
FIGS. 20A and 20B are schematic views respectively illustrating an electric wire material for forming one of the electric wires before and after being bent in the electric wire forming step.
Figure 20B:
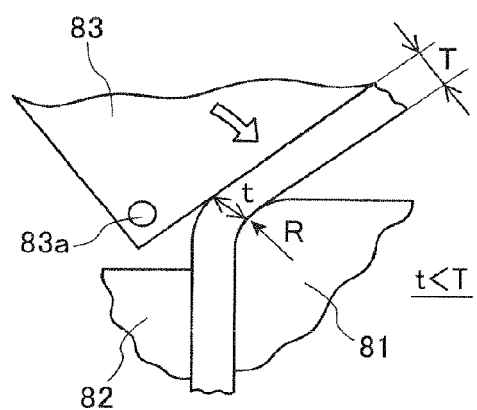

Specifically, referring to FIGS. 19 and 20A-20B, each of the electric wire materials 50a is shaped to form one of the electric wires 50 using a pair of first and second fixed jigs 81 and 82 and a rotating jig 83. The first and second fixed jigs 81 and 82 are opposed to each other so as to hold the electric wire material 50a therebetween. The rotating jig 83 is rotatably mounted to a supporting shaft 83a, so as to bend the electric wire material 50a held between the first and second fixed jigs 81 and 82 toward the first fixed jig 81. The first fixed jig 81 has a substantially right-angled corner portion 81a which makes contact with, when the electric wire material 50a is bent, the bent portion of the electric wire material 50a. In addition, the corner portion 81a is rounded with a constant radius of curvature R.

Figure 23A:
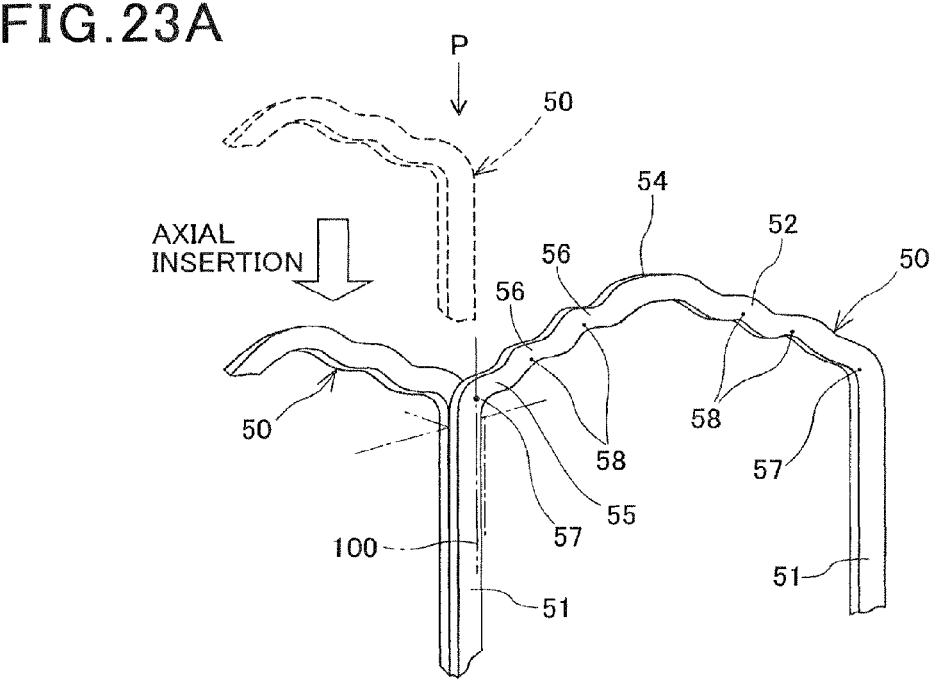
FIG. 23A is a perspective view illustrating the relative axial movement between a pair of the rolled electric wires in the stator coil forming step.
Figure 23B:
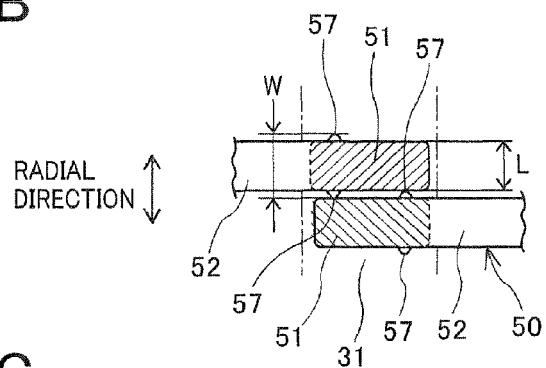
FIG. 23B is a view along the direction P indicated in FIG. 23A, wherein the in-slot portions of the electric wires, which are actually positioned behind the turn portions of the electric wires, are hatched for the sake of facilitating understanding.
Figure 23C:
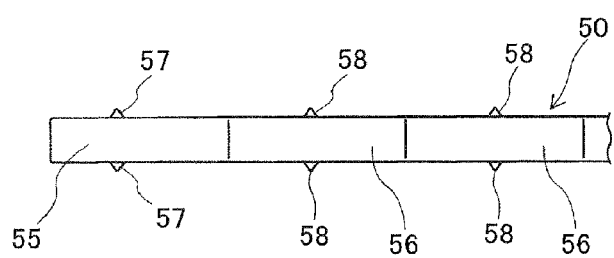
FIG. 23C is an axial end view of part of one of the rolled electric wires, wherein bulges 57 and 58 are enlarged for clarity.

More specifically, in this step, as shown in FIG. 20A, a portion of the electric wire material 50a which makes up one of the in-slot portions 51 of the electric wire 50 is first held between the first and second fixed jigs 81 and 82. Then, as shown in FIG. 20B, the rotating jig 83 is rotated about the supporting axis 83a toward the first fixed jig 81, thereby pressing the electric wire material 50a against the corner portion 81a of the first fixed jig 81. Consequently, that portion of the electric wire material 50a which adjoins the portion held between the first and second fixed jigs 81 and 82 is bent along the curved surface of the corner portion 81a at a substantially right angle to the portion held between the jigs 81 and 82, thereby forming a shoulder part 55 of the electric wire 50. Further, during the bending, a pair of bulges 57, which are shown in FIGS. 23A-23C but omitted from FIG. 20B, are respectively formed on the radial end faces (i.e., the surfaces parallel to the paper surface of FIG. 20B) of the bend. Each of the bulges 57 is located closer to the inside than the outside of the bend, and falls on an imaginary line that extends straight from the portion of the electric wire material 50a held between the first and second fixed jigs 81 and 82. Moreover, the bulges 57 also protrude from the portion of the electric wire material 50a held between the first and second fixed jigs 81 and 82 radially inward and radially outward, respectively.

Consequently, in the resultant electric wire 50, as shown in FIG. 23A, each of the bulges 57 is positioned to fall on an imaginary line 100 that extends straight from the corresponding in-slot portion 51. Moreover, as shown in FIG. 23B, the bulges 57 protrude from the corresponding in-slot portion 51 radially inward and radially outward, respectively.

In addition, as shown in FIG. 20B, the width of the electric wire material 50a is reduced at the bend from an initial value T to a smaller value t due to the formation of the bulges 57.

Further, in this step, by repeatedly operating the jigs 81-83 in the same manner as described above for that portion of the electric wire material 50a which adjoins the just-formed shoulder part 55, a shoulder part 56 is obtained with a bend formed between the shoulder parts 55 and 56. Moreover, a pair of bulges 58 as shown in FIGS. 23A and 23C are respectively formed on the radial end faces of the bend. The bulges 58 are located closer to the inside than the outside of the bend, and also protrude from that portion of the electric wire material 50a which makes up the in-slot portion 51 of the electric wire 50.

Furthermore, in this step, by repeatedly operating the jigs 81-83 in the same manner as described above for each of all the electric wire materials 50a, the plurality of (e.g., 48 in the present embodiment) electric wires 50 as shown in FIGS. 11A-11B are obtained.

In the electric wire rolling step 102, each of the substantially planar electric wires 50 formed in the electric wire forming step 101 is further rolled, through plastic deformation, by a predetermined number of turns into a spiral or circular-arc shape.

Figure 21:
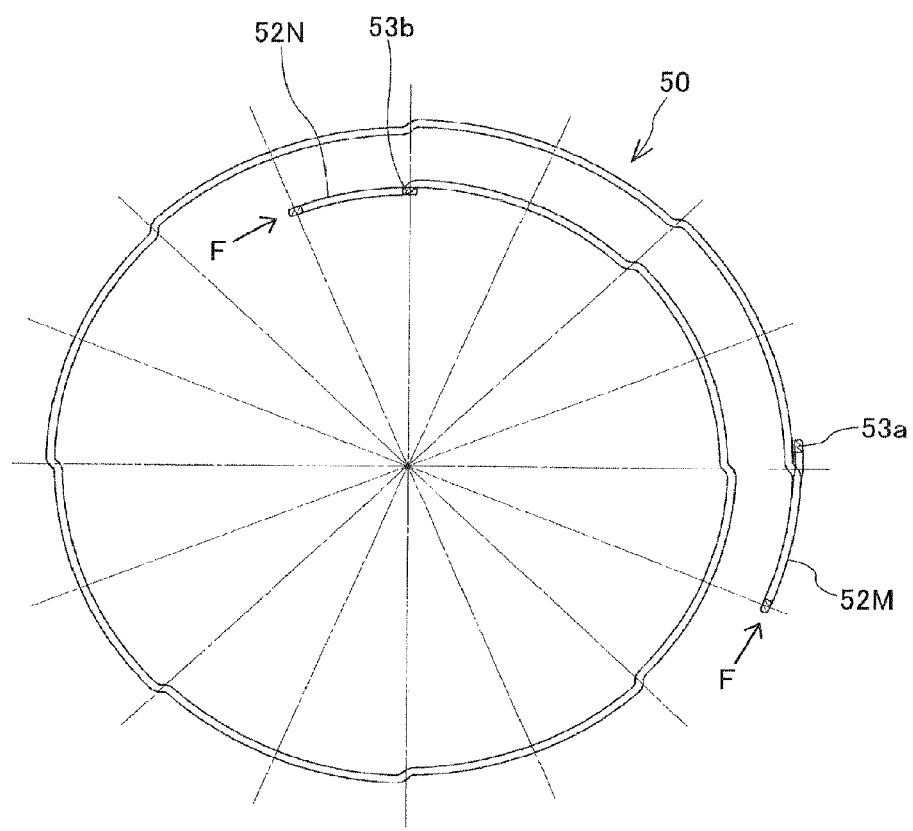
FIG. 21 is an axial end view of one of the electric wires which has been rolled into a spiral shape in an electric wire rolling step of the method.

In the present embodiment, as shown in FIG. 21, each of the electric wires 50 is rolled by about one and a half turns into a spiral shape. Specifically, in this step, the electric wire 50 is first rolled around the outer surface of a cylindrical core member (not shown), which has a plurality of predetermined outer diameters, by one turn; during the rolling, the electric wire 50 is pressed against the outer surface of the cylindrical core member by a first pressing jig (not shown) that is disposed radially outside the electric wire 50, thereby being plastically deformed. Then, a hollow cylindrical core member (not shown), which also has a plurality of predetermined outer diameters, is disposed on the first pressing jig. Thereafter, the electric wire 50 is further rolled around the outer surface of the hollow cylindrical core member by about a half turn; during the rolling, the electric wire 50 is pressed against the outer surface of the hollow cylindrical core member by a second pressing jig (not shown) that is disposed radially outside the about half turn of the electric wire 50, thereby being plastically deformed.

Figure 22A:
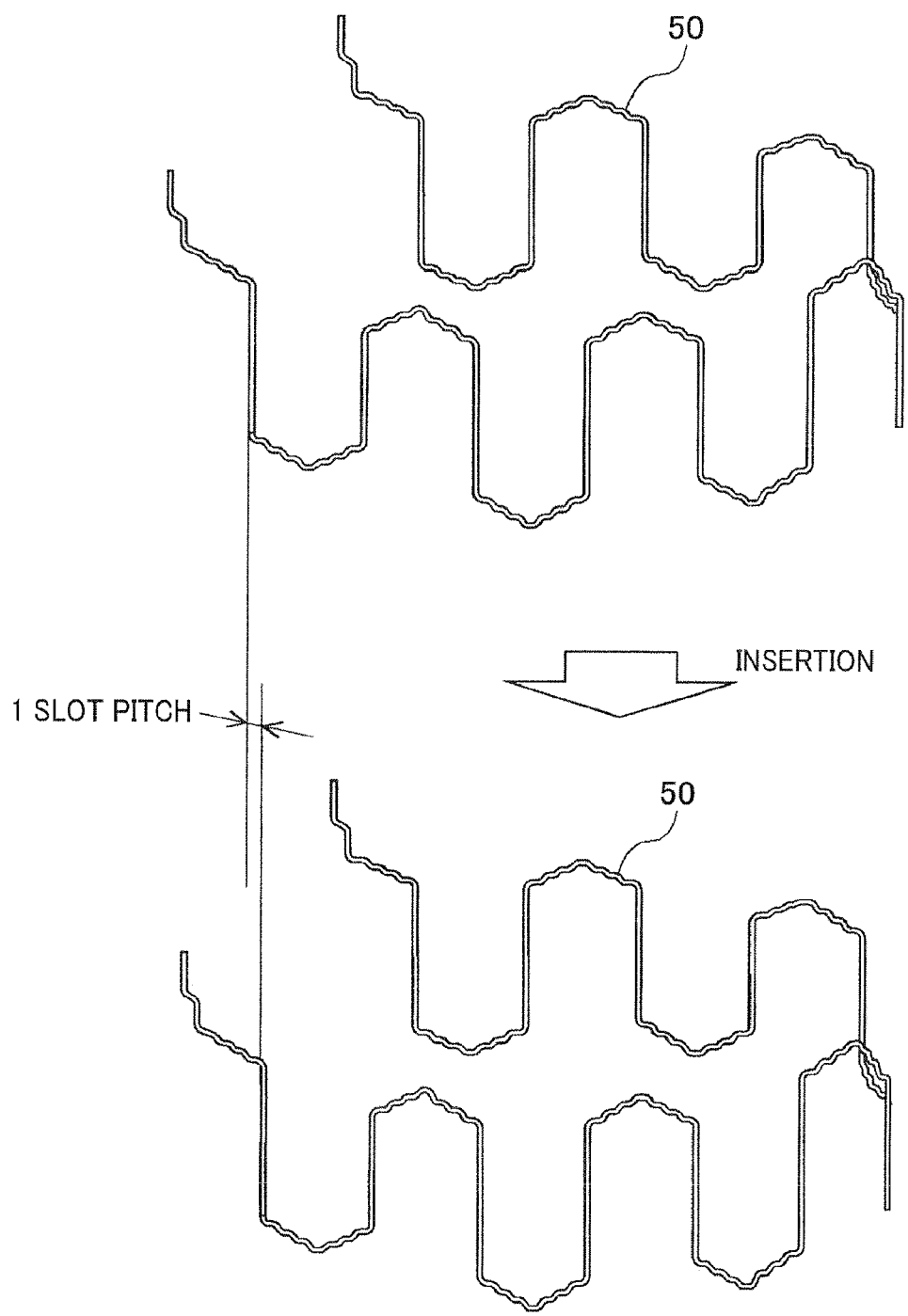
FIG. 22A is a schematic view illustrating the operation of axially moving one of the rolled electric wires toward another one of the same in a stator coil forming step of the method.

It should be noted that each of the electric wires 50 may also be rolled by less than one turn into a circular-arc shape as shown in FIG. 22A.

In the stator coil forming step 103, the rolled electric wires 50 are assembled together, through operations of creating relative axial movement therebetween, to form the stator coil 40.

Specifically, in this step, as shown in FIG. 22A, a pair of the electric wires 50 are assembled together by: (1) placing them so that they are offset from each other in the circumferential direction (i.e., the horizontal direction in FIG. 22A) by one slot pitch of the stator core 30; and (2) axially (i.e., in the vertical direction in FIG. 22A) moving one of them (i.e., the upper one in FIG. 22A) toward the other (i.e., the lower one in FIG. 22A).

Figure 22B:
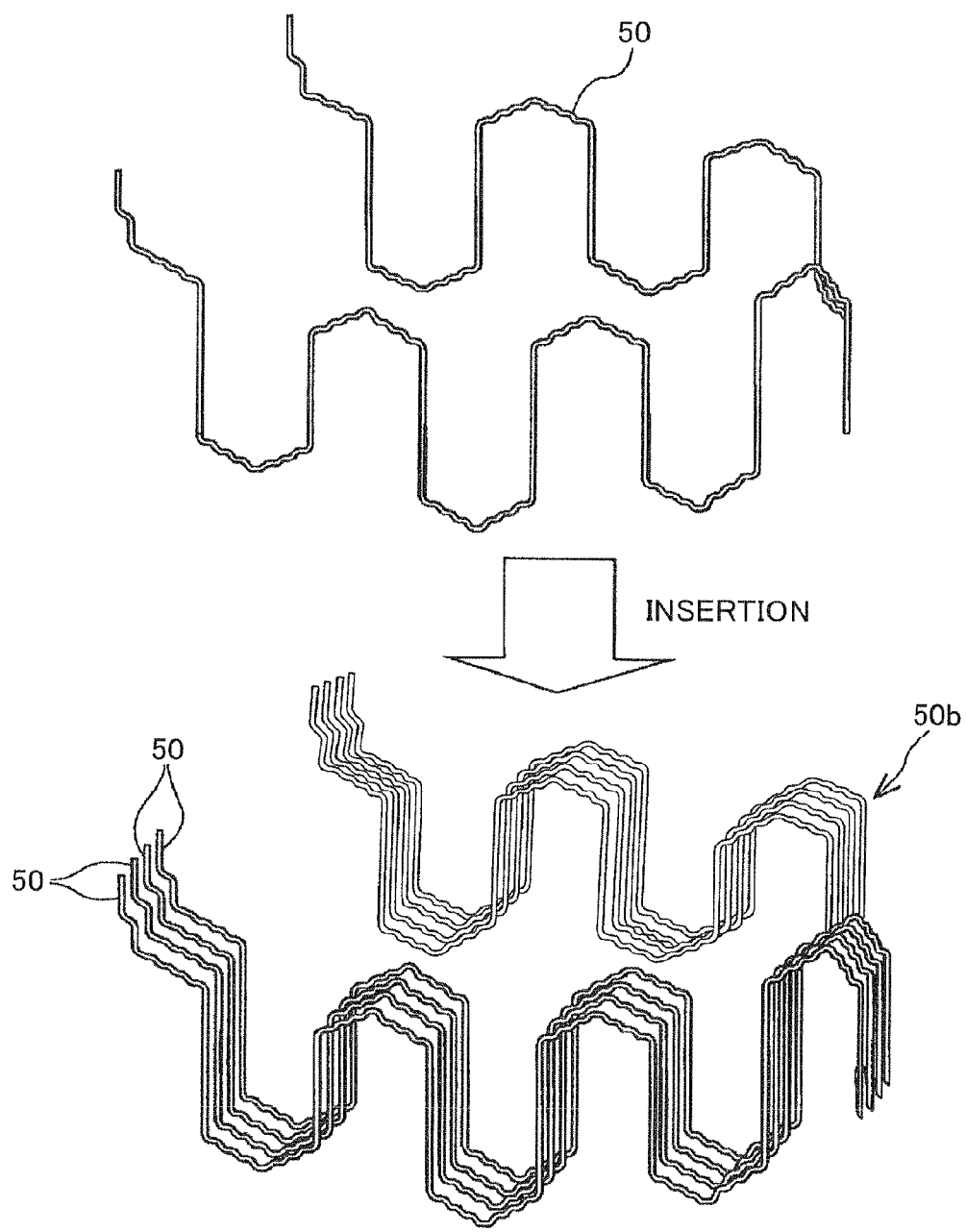
FIG. 22B is a schematic view illustrating the operation of axially moving one of the rolled electric wires toward an electric wire assembly, which is comprised of plural of the rolled electric wires, in the stator coil forming step.

Further, by repeating the above placing and moving operations, an electric wire assembly 50*b* are obtained which includes a plurality of (e.g., 4 in FIG. 22B) the electric wires 50. Furthermore, by repeating the above placing and moving operations, as shown in FIG. 22B, an electric wire 50 is further assembled to the electric wire assembly 50*b*, thereby forming a larger electric wire assembly 50*b*.

In the present embodiment, the stator coil 40 is formed by assembling the electric wires 50 one by one. More specifically, the stator coil 40 is formed by each time assembling only one electric wire 50 to another electric wire 50 in the same manner as illustrated in FIG. 22A or to an electric wire assembly 50*b* in the same manner as illustrated in FIG. 22B.

It should be noted that the stator coil 40 can also be formed by first forming a plurality of electric wire assemblies 50*b* and then assembling the electric wire assemblies 50*b* together. In addition, it also should be noted that for the sake of simplicity, the electric wires 50, which are rolled by about one and a half turns in the present embodiment, are depicted in FIGS. 22A-22B as being rolled only by less than one turn.

Furthermore, in the present embodiment, in assembling the electric wires 50, the electric wires 50 or the electric wire assemblies 50*b* are elastically deformed in the radial direction, so as to minimize interference between the electric wires 50 and the electric wire assemblies 50*b* and thereby facilitate relative axial movement therebetween.

For example, referring back to FIG. 21, when a load F is applied to both the ends of an electric wire 50 in a direction to unroll the electric wire 50, the electric wire 50 will be expanded radially outward. Consequently, when another electric wire 50 is axially inserted into the space formed radially inside the electric wire 50, interference between the two electric wires 50 will be reduced, thereby facilitating the assembly of the two electric wires 50.

Similarly, though not graphically shown, when a load F is applied to each of the ends of the electric wires 50 included in an electric wire assembly 50*b*, the electric wires 50 will be expanded radially outward. Consequently, when an electric wire 50 is axially inserted into the space formed radially inside the electric wire assembly 50*b*, interference between the electric wire 50 and the electric wire assembly 50*b* will be reduced, thereby facilitating the assembly of the electric wire 50 to the electric wire assembly 50*b*.

In the present embodiment, as described previously, each of the electric wires 50 has the bulges 57 formed on the radial end faces of the bends formed between the in-slot portions 51 and the shoulder parts 55 of the turn portions 52. Consequently, referring to FIGS. 23A-23C, during the relative axial movement between any pair of the electric wires 50, only the bulges 57 of one of the pair of the electric wires 50 will make point contact with the corresponding in-slot portions 51 of the other. Further, after the electric wires 50 are assembled together, each radially-adjacent pair of the in-slot portions 51 of the electric wires 50 will be kept apart from each other in the radial direction by the bulges 57 of the electric wires 50.

Generally, the insulating coat 68 of each of the electric wires 50 has pinholes and voids formed therein; through the pinholes, air can come into contact with the electric conductor 67 of the electric wire 50. Further, the voids may become pinholes when the outer surface of the insulating coat 68 is damaged by, for example, a frictional force applied thereto. Furthermore, when the pinholes of an adjacent pair of the electric wires 50 are located close to each other, an electrical short circuit may occur upon the intrusion of an electrolytic solution (e.g., a saline) into those pinholes.

However, in the present embodiment, as described previously, during the relative axial movement between any pair of the electric wires 50, only the bulges 57 of one of the pair of the electric wires 50 will make point contact with the in-slot portions 51 of the other. Consequently, the frictional force applied to the in-slot portions 51 of the electric wires 50 will be considerably reduced in comparison with the case where there are no bulges formed in the electric wires 50 and thus the in-slot portions 51 of one of the pair of the electric wires 50 respectively make surface contact with those of the other. As a result, it is possible to prevent the insulating coats 68 of the in-slot portions 51 of the electric wires 50 from being damaged due to the frictional force and thus to prevent the pinholes formed in the insulating coats 68 of the in-slot portions 51 from being located close to each other. Furthermore, as described previously, after the electric wires 50 are assembled together, each radially-adjacent pair of the in-slot portions 51 of the electric wires 50 will be kept apart from each other in the radial direction by the bulges 57 of the electric wires 50. Consequently, the creepage distances between the pinholes formed in the insulating coats 68 of the in-slot portions 51 of the electric wires 50 will be increased. Therefore, according to the present embodiment, it is possible to reliably prevent insulation failure between the in-slot portions 51 of the electric wires 50.

Moreover, in the present embodiment, as described previously, each of the electric wires 50 also has the bulges 58 formed on the radial end faces of the bends formed between the shoulder parts 55 and 56 of the turn portions 52, as shown in FIGS. 23A and 23C. Consequently, after the electric wires 50 are assembled together, each radially-adjacent pair of the turn portions 52 of the electric wires 50 will be kept apart from each other in the radial direction by the bulges 58 of the turn portions 52. As a result, the creepage distances between the pinholes formed in the insulating coats 68 of the turn portions 52 of the electric wires 50 will be increased. Therefore, according to the present embodiment, it is also possible to reliably prevent insulation failure between the turn portions 52 of the electric wires 50.

Furthermore, in the present embodiment, referring to FIG. 23B, there is specified, through an experimental investigation, the following dimensional relationship: $1.0 < W/L \leq 1.1$, where W is the radial thickness of those portions of the electric wires 50 where the bulges 57 or 58 are formed and L is the radial thickness of the in-slot portions 51 of the electric wires 50 where no bulges are formed.

Specifically, in the experimental investigation, a load of axial insertion is measured at each of a plurality of values of W/L. Here, the load of axial insertion denotes the load needed to be applied for axially inserting an electric wire 50 or electric wire assembly 50*b* into the space formed radially inside another electric wire 50 or electric wire assembly 50*b*. Then, a relative load of axial insertion is determined at each of the plurality of values of W/L as the ratio of the measured load of axial insertion at the value of W/L to the measured load of axial insertion at W/L of 1.0.

Figure 24:
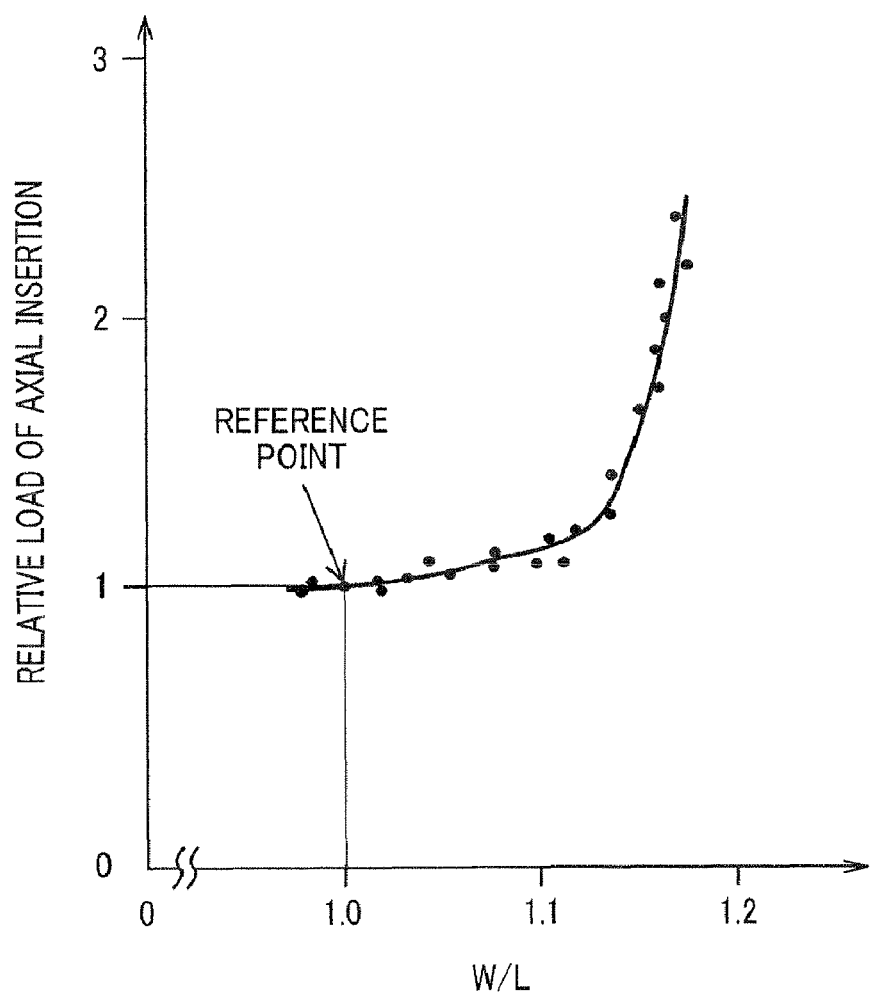
FIG. 24 is a graph illustrating the relationship between the relative load of axial insertion and W/L, the relationship being determined by an experimental investigation.

FIG. 24 shows the results of the experimental investigation, where the horizontal axis represents W/L, and the vertical axis represents the relative load of axial insertion.

As seen from FIG. 24, in the range of W/L from 1.0 to 1.1, the relative load of axial insertion increased very slowly with W/L. However, with increase in W/L above 1.1, it became easier for the bulges 57 and 58 to interfere with the corresponding in-slot portions 51 and turn portions 52, causing the relative load of axial insertion to increase rapidly. As a result, it became difficult to accomplish the axial insertion only by elastically deforming the electric wires 50 or electric wire assemblies 50b. In other words, to accomplish the axial insertion, it was necessary to plastically deform the electric wires 50 or electric wire assemblies 50b, resulting in undesired positional deviations of the in-slot portions 51. In addition, with the rapidly-increased relative load of axial insertion, it became easier for the insulating coats 68 of the electric wires 50 to be damaged due to overstress during the axial insertion.

Base on the above results of the experimental investigation, in the present embodiment, W/L is specified to be in the range of 1.0 to 1.1, so as to facilitate the assembly of the electric wires 50 without plastically deforming them and without damaging the insulating coats 68 thereof. In addition, W and L may be respectively set to, for example, 2.1 mm and 2.0 mm.

After assembling all of the electric wires 50 together as described above, the corresponding pairs of the lead portions 53a and 53b of the electric wires 50 are joined together by, for example, welding. As a result, the stator coil 40 as shown in FIGS. 6-9 is obtained.

In the subsequent stator core mounting step 104, the stator core 30 is mounted to the stator coil 40 formed in the stator coil forming step 103.

Specifically, in this step, the tooth portions 33 of the stator core segments 32 are respectively inserted into the spaces formed between the stacks of the in-slot portions 51 of the electric wires 50 from the radially outside of the stator coil 40. Then, the outer rim 37 is fitted onto the radially outer surfaces of the stator core segments 32. As a result, the stator core 30 and the stator coil 40 are assembled together, forming the stator 20 as shown in FIGS. 1-3.

The above-described stator 20 according to the present embodiment has the following advantages.

In the present embodiment, the stator 20 includes the hollow cylindrical stator core 30 and the stator coil 40. The stator core 30 has the longitudinal axis O and the slots 31 that are formed in the radially inner surface of the stator core 30 and spaced in the circumferential direction of the stator core 30. The stator coil 40 is comprised of the electric wires 50 that are mounted on the stator core 30 so as to be offset from one another in the circumferential direction of the stator core 30. Each of the electric wires 50 has the first to the twelfth in-slot portions 51A-51L and the first to the eleventh turn portions 52A-52K. The twelve (i.e., n=12) in-slot portions 51A-51L are sequentially received in eight (i.e., p=8, p being an integer not greater than n) slots 31 of the stator core 30. The eleven (i.e., (n−1)=11) turn portions 52A-52K are alternately located on the opposite axial sides of the stator core 30 outside the slots 31 to connect corresponding adjacent pairs of the first to the twelfth in-slot portions 51A-51L. Further, for each of the electric wires 50, the radial distances of the first to the twelfth in-slot portions 51A-51L from the axis O of the stator core 30 successively decrease. Furthermore, each of the electric wires 50 is formed to include the bulges 57. Each of the bulges 57 is formed, on a radial end face of a portion of the electric wire 50 which falls on the imaginary line 100 extending axially from a corresponding one of the in-slot portions 51 of the electric wire 50, so as to protrude from the corresponding in-slot portion 51 radially inward or radially outward. More particularly, in the present embodiment, each of the bulges 57 is formed on a radial end face of a corresponding one of the bends formed between the shoulder parts 55 of the turn portions 52 and the in-slot portions 51 of the electric wire 50.

With the above configuration, in the stator coil forming step 103, only the bulges 57 of one of the electric wires 50 will make point contact with the in-slot portions 51 of another one of the electric wires 50, thereby considerably reducing the frictional force applied to the in-slot portions 51. As a result, it is possible to prevent the insulating coats 68 of the in-slot portions 51 from being damaged due to the frictional force. Moreover, after the electric wires 50 are assembled together, each radially-adjacent pair of the in-slot portions 51 of the electric wires 50 will be kept apart from each other in the radial direction by the bulges 57 of the electric wires 50. Consequently, the creepage distances between the pinholes formed in the insulating coats 68 of the in-slot portions 51 of the electric wires 50 will be increased. Therefore, with the bulges 57, it is possible to reliably prevent insulation failure between the in-slot portions 51 of the electric wires 50.

Moreover, in the present embodiment, each of the electric wires 50 further includes the bulges 58. Each of the bulges 58 is formed on a radial end face of a corresponding one of the bends formed between the shoulder parts 55 and 56 of the turn portions 52 of the electric wire 50 so as to protrude radially inward or radially outward.

With the above configuration, after the electric wires 50 are assembled together, each radially-adjacent pair of the turn portions 52 of the electric wires 50 will be kept apart from each other in the radial direction by the bulges 58 of the turn portions 52. Consequently, the creepage distances between the pinholes formed in the insulating coats 68 of the turn portions 52 of the electric wires 50 will be increased. As a result, it is possible to reliably prevent insulation failure between the turn portions 52 of the electric wires 50.

In the present embodiment, the first in-slot portions 51A of the electric wires 50 are located most radially outward and the twelfth in-slot portions 51L are located most radially inward in the slots 31 of the stator core 30. Further, each of the electric wires 50 also has the lead portions (or first and second end portions) 53a and 53b. The lead portion 53a is positioned on the first in-slot portion 51A side; in other words, the lead portion 53a is closer to the first in-slot portion 51A than any other of the in-slot portions 51 of the electric wire 50. On the other hand, the lead portion 53b is positioned on the twelfth in-slot portion 51L side; in other words, the lead portion 53b is closer to the twelfth in-slot portion 51L than any other of the in-slot portions 51 of the electric wire 50. Moreover, the stator coil 40 is a three-phase stator coil which is comprised of the U-phase, V-phase, and W-phase windings 43. Each of the U-phase, V-phase, and W-phase windings 43 is formed by connecting 16 electric wires 50. Furthermore, the 16 electric wires 50 include at least a pair of the electric wires 50 one of which has its lead portion 53a connected to the lead portion 53b of the other.

With the above configuration, since each of the phase windings 43 of the stator coil 40 is formed of the 16 electric wires 50, it is possible to shorten the length of each of the electric wires 50. Consequently, the electric wires 50 can be formed and rolled using small-scale devices in the electric wire forming and rolling steps 101 and 102, and be easily moved in the stator coil forming step 103. As a result, it is possible to achieve a high productivity and a low cost of the stator coil 40. Moreover, since the first in-slot portions 51A of the electric wires 50 are located most radially outward and the twelfth in-slot portions 51L are located most radially inward in the slots 31 of the stator core 30, the lead portions 53a and 53b of each of the electric wires 50 can be respectively led out from the radially inner and outer peripheries of the stator core 30. Consequently, each corresponding pair of the lead portions 53a and 53b of the electric wires 50 can be respectively led out from two sufficiently-distant places. As a result, flexibility is improved in the connecting of the electric wires 50.

In the present embodiment, the stator coil 40 is formed by first shaping (i.e., bending and rolling) each of the electric wires 50 by plastically deforming it in the electric wire forming and rolling steps 101 and 102, and then assembling the electric wires 50 by creating relative axial movement therebetween in the stator coil forming step 103.

With the above formation of the stator coil 40, since each of the electric wires 50 is shaped by plastically deforming it, no spring back of the electric wires 50 will occur after the electric wire rolling step 102. Consequently, in the subsequent stator coil forming step 103, it is possible to easily and accurately manipulate (i.e., place and axially move) the shaped electric wires 50, thereby facilitating the assembling of the electric wires 50. Further, after the stator coil forming step 103, it is possible to reliably prevent misalignment between the corresponding in-slot portions 50 of the electric wires 50 from occurring, thereby reliably keeping the hollow cylindrical shape of the stator coil 40. Consequently, in the stator core mounting step 104, it is possible to easily and accurately mount the stator core 30 to the stator coil 40. As a result, it is possible to improve the productivity of the stator 20 while ensuring both high dimensional accuracy and high reliability of the stator 20.

In the present embodiment, there is specified the dimensional relationship of $1.0 < W/L \leq 1.1$, where W is the radial thickness of those portions of the electric wires 50 where the bulges 57 or 58 are formed and L is the radial thickness of the in-slot portions 51 of the electric wires 50 where no bulges are formed.

Specifying the above relationship, it is possible to facilitate the assembly of the electric wires 50 in the stator coil forming step 103 without plastically deforming them and without damaging the insulating coats 68 thereof.

In the present embodiment, the number of the electric wires 50 forming the stator coil 40 is equal to 48; the number of the slots 31 formed in the stator core 30 is also equal to 48. That is, the number of the electric wires 50 is equal to that of the slots 31. Further, electric wires 50 are offset from one another in the circumferential direction of the stator core 30 by one slot pitch of the stator core 30.

With the above configuration, it is possible to form the stator coil 40 to have a substantially perfect hollow-cylindrical shape. Further, with the substantially perfect hollow-cylindrical shape of the stator coil 40, it is possible to ensure a high performance of the electric rotating machine. In addition, it is possible to shorten the length of each of the electric wires 50.

In the present embodiment, in each of the slots 31 of the stator core 30, the in-slot portions 51 of the electric wires 50 are radially stacked in 12 layers. That is, the number of the in-slot portions 51 of the electric wires 50 radially stacked in each of the slots 31 of the stator core 30 is equal to the number of the in-slot portions 51 provided in each of the electric wires 50.

With the above configuration, it is possible to arrange the first in-slot portions 51A most radially outward and the twelfth in-slot portions 51L most radially inward in the respective slots 31.

In the present embodiment, all of the ith in-slot portions 51 of the electric wires 50 are respectively received in circumferentially-adjacent different slots 31 of the stator core 30, and all of the radial distances from the axis O of the stator core 30 to the ith in-slot portions 51 of the electric wires 50 are equal, where $i=1, 2, \ldots, 12$.

With the above configuration, both the outside and inside diameters of the stator coil 40 can be made uniform in the circumferential direction of the stator core 30.

In the present embodiment, for each of the electric wires 50 forming the stator coil 40, the eight slots 31 of the stator core 30, in which the first to the twelfth in-slot portions 51A-51L of the electric wire 50 are sequentially received, are circumferentially spaced at a six-slot pitch.

With the above configuration, it is possible to form the stator coil 40 to have a desired number of phases (i.e., three phases in the present embodiment).

In the present embodiment, each of the electric wires 50 forming the stator coil 40 is comprised of the electric conductor 67 having the substantially rectangular cross section and the insulating coat 68 covering the outer surface of the electric conductor 67.

With the substantially rectangular cross section, it is possible to densely arrange the in-slot portions 51 of the electric wires 50 in the slots 31 of the stator core 30, thereby ensuring high space factors of the electric wires 50 in the slots 31. Moreover, it is also possible to densely arrange the turn portions 52 of the electric wires 50, thereby minimizing the radial size of the coil end parts 42 of the stator coil 40.

In the present embodiment, the stator coil 40 is so configured that when viewed along the axis O of the stator core 30, each of the electric wires 50 forming the stator coil 40 spirally extends around the axis O of the stator core 30.

With the above configuration, it is possible to densely arrange the electric wires 50 without increasing the radial dimension of the stator core 40.

While the above particular embodiment of the present invention has been shown and described, it will be understood by those skilled in the art that various modifications, changes, and improvements may be made without departing from the spirit of the invention.

For example, FIG. 25A illustrates a first modification of the electric wires 50. In this modification, the half-turn portions 52M and 52N are formed to extend outward in the longitudinal direction of the electric wire 50 respectively from the first and twelfth in-slot portions 51A and 51L. Consequently, the lead portions 53a and 53b are respectively offset outward in the longitudinal direction from the first and twelfth in-slot portions 51A and 51L by the lengths of the half-turn portions 52M and 52N.

FIG. 25B illustrates a second modification of the electric wires 50. In this modification, the half-turn portion 52M is formed to extend outward in the longitudinal direction of the electric wire 50 from the first in-slot portion 51A, whereas the half-turn portion 52N is formed to extend inward in the longitudinal direction from the twelfth in-slot portion 51L. Consequently, the lead portion 53a is offset outward in the longitudinal direction from the first in-slot portion 51A by the length of the half-turn portion 52M, whereas the lead portion 53b is offset inward in the longitudinal direction from the twelfth in-slot portion 51L by the length of the half-turn portion 52N.

Figure 26A:
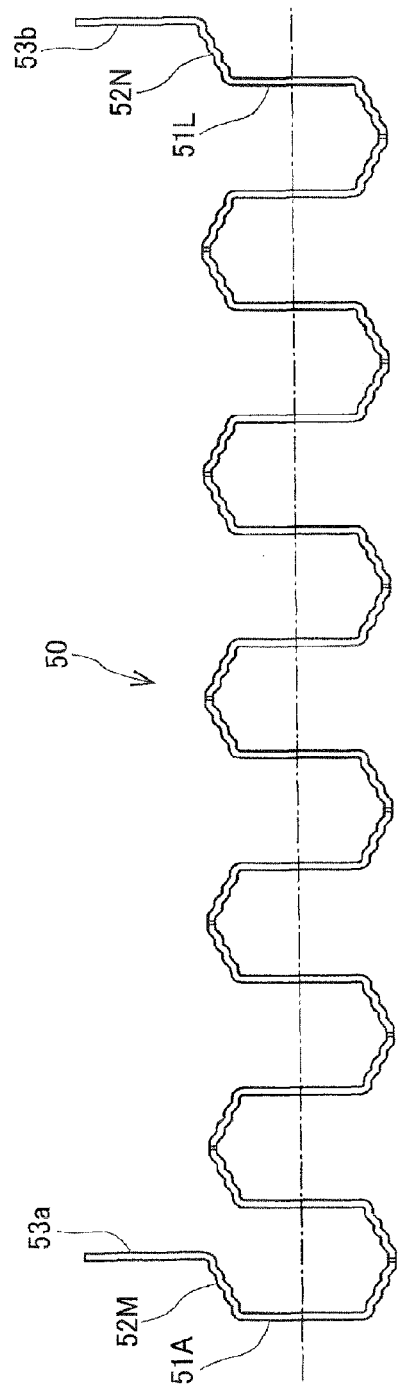
FIG. 26A is a front view of an electric wire for forming the stator coil according to a third modification of the invention.

FIG. 26A illustrates a third modification of the electric wires 50. In this modification, the half-turn portion 52M is formed to extend inward in the longitudinal direction of the electric wire 50 from the first in-slot portion 51A, whereas the half-turn portion 52N is formed to extend outward in the longitudinal direction from the twelfth in-slot portion 51L. Consequently, the lead portion 53a is offset inward in the longitudinal direction from the first in-slot portion 51A by the length of the half-turn portion 52M, whereas the lead portion 53b is offset outward in the longitudinal direction from the twelfth in-slot portion 51L by the length of the half-turn portion 52N.

Figure 26B:
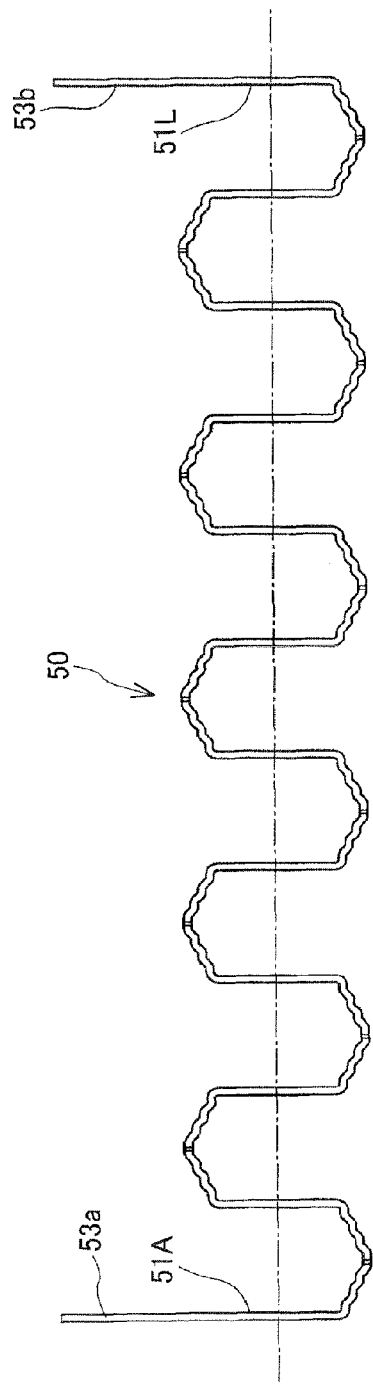
FIG. 26B is a front view of an electric wire for forming the stator coil according to a fourth modification of the invention.

FIG. 26B illustrates a fourth modification of the electric wires 50. In this modification, both the half-turn portions 52M and 52N are omitted so that the lead portions 53a and 53b extend straight respectively from the first and twelfth in-slot portions 51A and 51L without being offset therefrom in the longitudinal direction of the electric wire 50.

Figure 27:
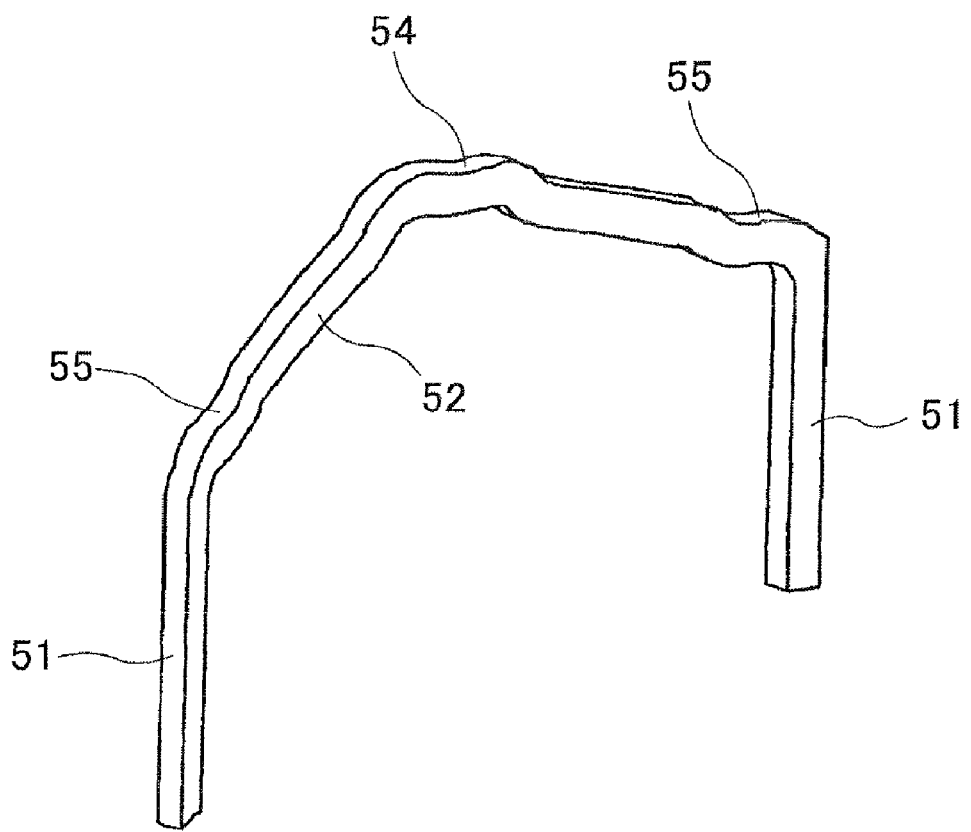
FIG. 27 is a perspective view illustrating a turn portion of an electric wire for forming the stator coil according to a fifth modification of the invention.

FIG. 27 illustrates a fifth modification of the electric wires 50. In this modification, the shoulder parts 56 as shown in FIG. 12A are omitted from each of the turn portions 52 of the electric wires 50. Consequently, those parts between the crank-shaped part 54 and the shoulder parts 55 in each of the turn portions 52 of the electric wires 50 become straight. As a result, the shape of the turn portions 52 of the electric wires 50 is simplified, thereby facilitating the shaping of the electric wires 50.

Figure 28A:
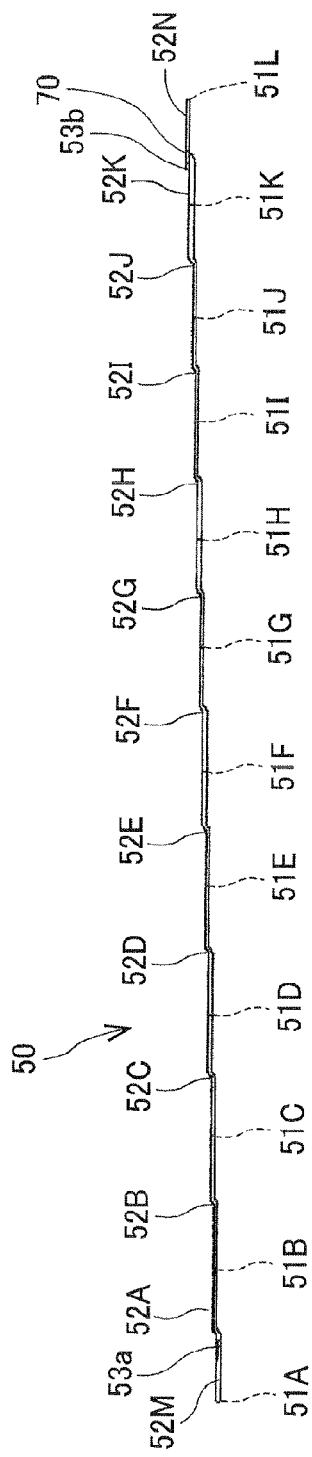
FIG. 28A is a top view of an electric wire for forming the stator coil according to a sixth modification of the invention.
Figure 28B:
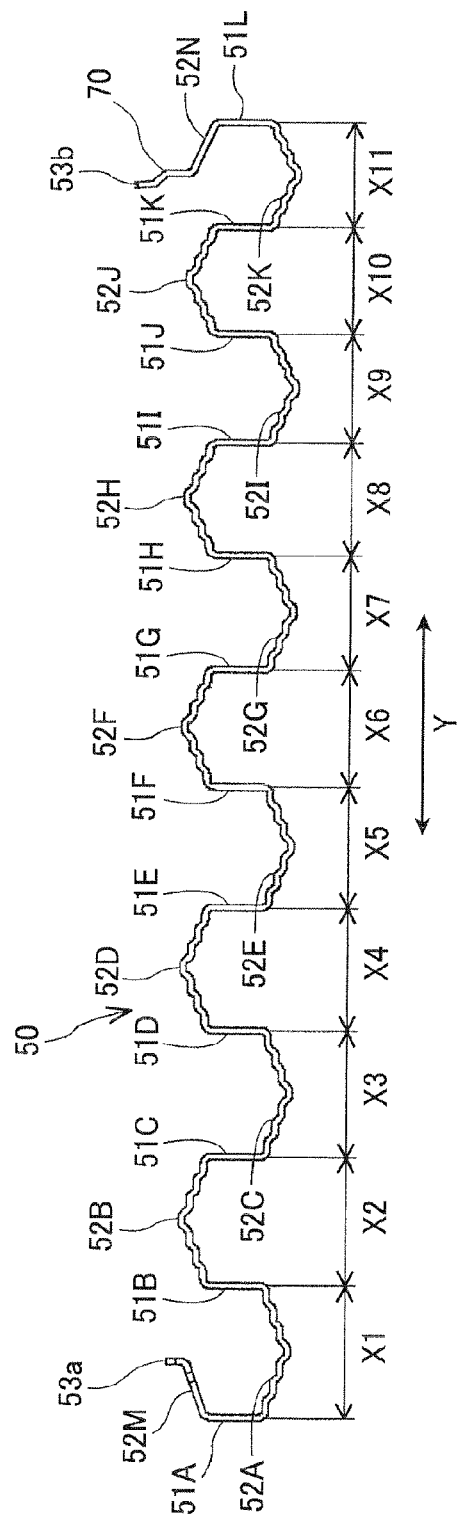
FIG. 28B is a front view of the electric wire according to the sixth modification.

FIGS. 28A-28B illustrate a sixth modification of the electric wires 50. In this modification, both the half-turn portions 52M and 52N are shaped straight without being stepped as shown in FIGS. 11A-11B. With the straight shape of the half-turn portions 52M and 52N, the lead portions 53a and 53b can be more easily and accurately positioned. In addition, it is also possible to shape only one of the half-turn portions 52M and 52N straight.

In the previous embodiment, each of the turn portions 52 of the electric wires 50 includes the crank-shaped part 54 that is formed substantially at the center of the turn portion 52 for radially offsetting a corresponding pair of the in-slot portions 51 connected by the turn portion 52. However, the crank-shaped part 54 is not necessarily formed substantially at the center of the turn portion 52. For example, the crank-shaped part 54 may be formed in the vicinity of one end of the turn portion 52.

In the previous embodiment, the amount of radial offset made by each of the crank-shaped parts 54 of the turn portions 52 is set to be equal to the radial thickness of the in-slot portions 51 of the electric wires 50. However, the amount of radial offset made by each of the crank-shaped parts 54 may also be set to be, for example, 0.5, 1.5, or 2 times the radial thickness of the in-slot portions 51. In such cases, the difference in radial distance from the axis O of the stator core 30 between each adjacent pair of the in-slot portions 51, which are connected by a corresponding one of the turn portions 52, would be accordingly 0.5, 1.5, or 2 times the radial thickness of the in-slot portions 51.

Figure 29A:
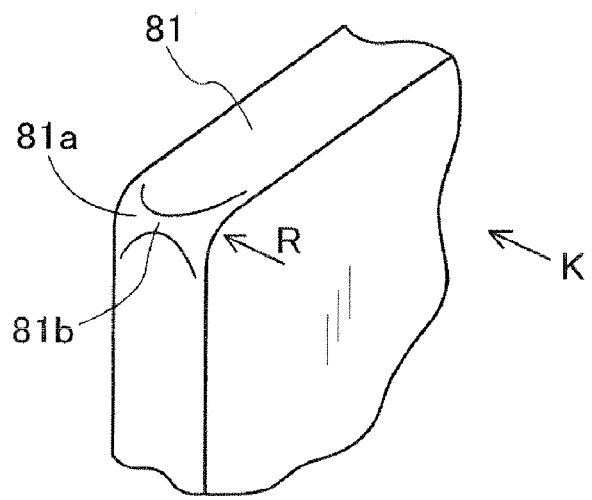
FIG. 29A is a perspective view illustrating a modification of a first fixed jig which is used in the electric wire forming step.
Figure 29B:
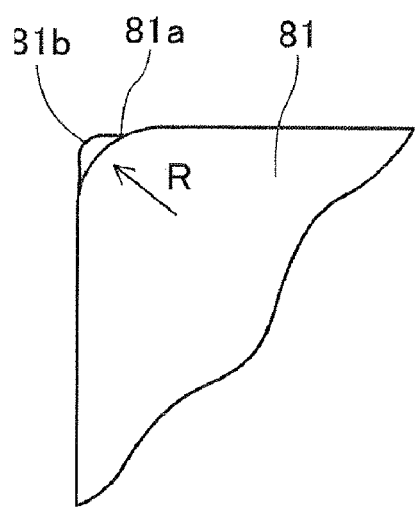
FIG. 29B is a view along the K direction in FIG. 28A.

In the previous embodiment, the corner portion 81a of the first fixed jig 81 used in the electric wire forming step 101 is rounded with the constant radius of curvature R to have a smooth curved outer surface. However, as shown in FIGS. 29A-29B, it is also possible to provide a protrusion 81b at the center of the curved outer surface of the corner portion 81a; the protrusion 81b is rounded with a radius of curvature smaller than R. In this case, it is possible to facilitate the formation of the bulges 57 during the bending of the electric wire 50 against the first fixed jig 81. In addition, the protrusion 81b may also be provided on the curved outer surface of the corner portion 81a so as to be offset from the center of the curved outer surface.

Figure 30A:
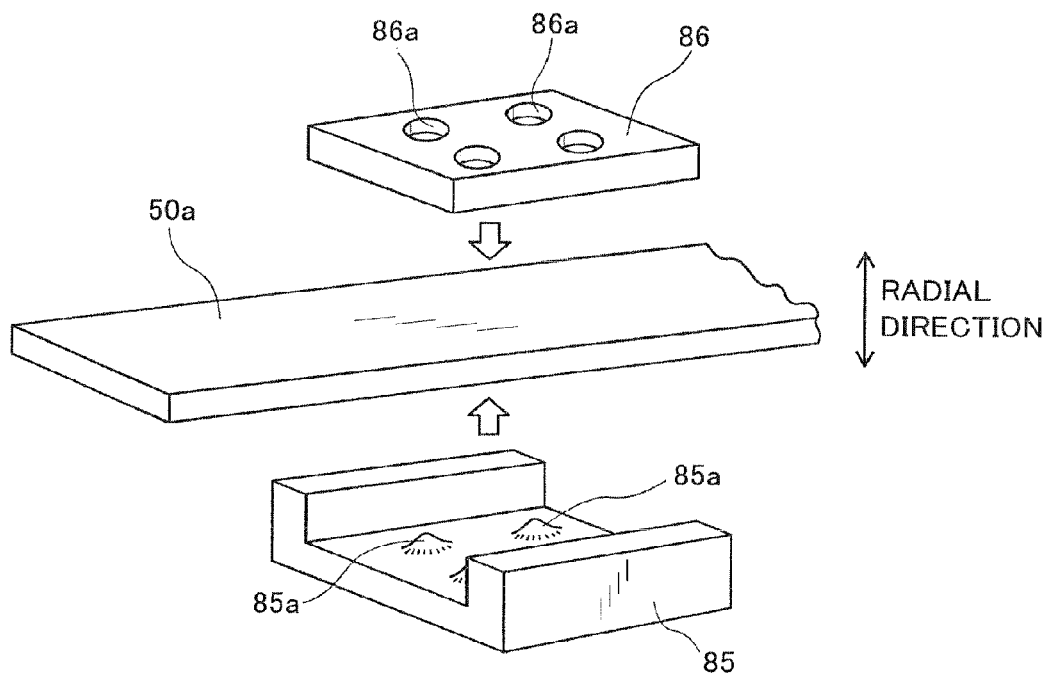
FIG. 30A is a perspective view illustrating the process of forming bulges in an electric wire material according to a modification of the invention.
Figure 30B:
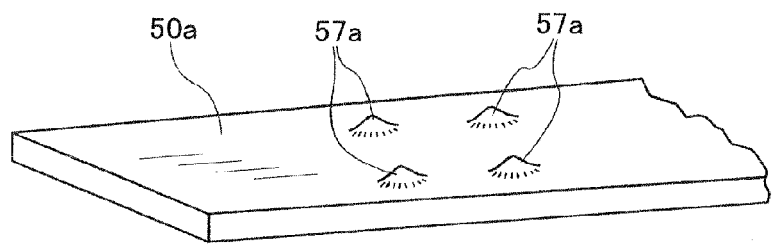
FIG. 30B is a perspective view illustrating the bulges formed in the electric wire material by the process.

In the previous embodiment, each of the bulges 57 is formed on a radial end face of a corresponding one of the bends formed between the shoulder parts 55 of the turn portions 52 and the in-slot portions 51 of the electric wire 50. However, it is also possible to form bulges on the radial end faces of the in-slot portions 51 of the electric wire 50 using a pair of first and second jigs 85 and 86 as shown in FIGS. 30A-30B.

More specifically, the first jig 85 is substantially U-shaped and has a plurality of (e.g., 4) protrusions 85a that are formed on the inner surface of the bottom wall of the first jig 85. The second jig 86 is plate-shaped and has a plurality of (e.g., 4) through-holes 86a. In forming the electric wire 50, the electric wire material 50a is first interposed between the first and second jigs 85 and 86, with each of the protrusions 85a of the first jig 85 aligned with a corresponding one of the through-holes 86a of the second jig 86. Then, the electric wire material 50a is pressed between the first and second jigs 85 and 86. Consequently, portions of the electric wire material 50a are respectively extruded by the protrusions 85a of the first jig 85 into the through-holes 86a of the second jig 86, thereby forming bulges 57a on a radial end face (i.e., the upper face in FIGS. 30A-30B) of a portion of the electric wire material 50a which makes up one of the in-slot portions 51 of the electric wire 50.

What is claimed is:

1. A stator for an electric rotating machine, the stator comprising:

a hollow cylindrical stator core having a longitudinal axis and a plurality of slots that are formed in a radially inner surface of the stator core and spaced in a circumferential direction of the stator core; and a stator coil comprised of a plurality of electric wires that are mounted on the stator core so as to be offset from one another in the circumferential direction of the stator core, wherein each of the electric wires has first, second, . . . , and nth in-slot portions and first, second, . . . , and (n−1)th turn portions, where n is an integer not less than 4, the first to the nth in-slot portions are sequentially received in p of the slots of the stator core, where p is an integer not greater than n, the first to the (n−1)th turn portions are alternately located on opposite axial sides of the stator core outside the slots to connect corresponding adjacent pairs of the first to the nth in-slot portions, and radial distances from the axis of the stator core to the first to the nth in-slot portions successively decrease, and wherein each of the electric wires further includes a plurality of bulges, each of the bulges being formed, on a surface of a corresponding one of the in-slot portions of the electric wire or a surface of a portion of the electric wire which falls on an imaginary line extending axially from the corresponding in-slot portion, so as to protrude from the corresponding in-slot portion in a radial direction of the stator core.

2. The stator as set forth in claim 1, wherein each of the electric wires is formed so that each of the turn portions of the electric wire includes a pair of shoulder parts, each of the shoulder parts adjoins a corresponding one of the in-slot portions of the electric wire and is bent at a substantially right angle to the corresponding in-slot portion to form a bend between the shoulder and the corresponding in-slot portion, and each of the bulges is formed on a surface of a corresponding one of the bends formed between the shoulder parts of the turn portions and the in-slot portions of the electric wire.

3. The stator as set forth in claim 1, wherein each of the electric wires is formed so that each of the turn portions of the electric wire is stepped to include a plurality of shoulder parts that extend substantially perpendicular to the in-slot portions, and each of the electric wires further includes a plurality of second bulges, each of the second bulges being formed on a surface of a corresponding one of bends formed between the shoulder parts of the turn portions of the electric wire so as to protrude in a radial direction of the stator core.

4. The stator as set forth in claim 1, wherein the first in-slot portions of the electric wires are located most radially outward and the nth in-slot portions are located most radially inward in the slots of the stator core, each of the electric wires also has first and second end portions, the first end portion being closer to the first in-slot portion than any other of the in-slot portions of the electric wire, the second end portion being closer to the nth in-slot portion than any other of the in-slot portions of the electric wire, the stator coil is a multi-phase stator coil which is comprised of a plurality of phase windings, each of the phase windings of the stator coil is formed of at least two of the electric wires, and the first end portion of one of the two electric wires is connected to the second end portion of the other electric wire.

5. The stator as set forth in claim 1, wherein the stator coil is formed by first shaping each of the electric wires by plastically deforming it and then assembling the electric wires by creating relative axial movement therebetween.

6. The stator as set forth in claim 5, wherein $1.0<W/L\leq 1.1$, where W is a radial thickness of those portions of the electric wires where the bulges are formed and L is a radial thickness of those portions of the in-slot portions of the electric wires where no bulges are formed.

7. The stator as set forth in claim 1, wherein $1.0<W/L\leq 1.1$, where W is a radial thickness of those portions of the electric wires where the bulges are formed and L is a radial thickness of those portions of the in-slot portions of the electric wires where no bulges are formed.

8. The stator as set forth in claim 1, wherein the number of the electric wires forming the stator coil is equal to the number of the slots formed in the stator core, and the electric wires are offset from one another in the circumferential direction of the stator core by one slot pitch of the stator core.

9. The stator as set forth in claim 1, wherein in each of the slots of the stator core, the in-slot portions of the electric wires are radially stacked in n layers.

10. The stator as set forth in claim 1, wherein all of the ith in-slot portions of the electric wires are respectively received in circumferentially-adjacent different ones of the slots of the stator core, and all of the radial distances from the axis of the stator core to the ith in-slot portions of the electric wires are equal, where $i=1, 2, \ldots, n$.

11. The stator as set forth in claim 1, wherein for each of the electric wires forming the stator coil, the p slots of the stator core in which the first to the nth in-slot portions of the electric wire are sequentially received, are circumferentially spaced at a pitch of a predetermined number of the slots of the stator core.

12. The stator as set forth in claim 1, wherein each of the electric wires forming the stator coil is comprised of an electric conductor having a substantially rectangular cross section and an insulating coat covering an outer surface of the electric conductor.

13. The stator as set forth in claim 1, wherein when viewed along the axis of the stator core, each of the electric wires spirally extends around the axis of the stator core.

* * * * *